United States Patent
Raghavan et al.

(10) Patent No.: US 6,776,738 B2
(45) Date of Patent: Aug. 17, 2004

(54) FAMILY OF MULTI-SPEED TRANSMISSIONS WITH A STATIONARY PLANETARY MEMBER AND INPUT CLUTCHES

(75) Inventors: Madhusudan Raghavan, West Bloomfield, MI (US); Patrick Benedict Usoro, Troy, MI (US); Chunhao J. Lee, Troy, MI (US); Norman Kenneth Bucknor, Troy, MI (US); Chi-Kuan Kao, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/282,900

(22) Filed: Oct. 29, 2002

(65) Prior Publication Data

US 2004/0082424 A1 Apr. 29, 2004

(51) Int. Cl.$^7$ .............................................. F16H 3/66
(52) U.S. Cl. ...................................... 475/296; 475/275
(58) Field of Search ................................ 475/275, 296, 475/269

(56) References Cited

U.S. PATENT DOCUMENTS

| | | | |
|---|---|---|---|
| 4,070,927 A | 1/1978 | Polak ........................... | 74/765 |
| 4,709,594 A | 12/1987 | Maeda ......................... | 74/753 |
| 5,106,352 A | 4/1992 | Lepelletier .................. | 475/280 |
| 5,599,251 A | 2/1997 | Beim et al. .................. | 475/275 |
| 6,053,839 A | 4/2000 | Baldwin et al. ............. | 475/281 |
| 6,071,208 A | 6/2000 | Koivunen ..................... | 475/275 |
| 6,083,135 A | 7/2000 | Baldwin et al. ............. | 475/276 |
| 6,217,474 B1 | 4/2001 | Ross et al. .................. | 475/269 |
| 6,648,792 B2 * | 11/2003 | Usoro et al. ................. | 475/296 |

FOREIGN PATENT DOCUMENTS

| | | | |
|---|---|---|---|
| JP | 6-213292 A | * | 8/1994 |
| JP | 9-126282 A | * | 5/1997 |
| JP | 9-126283 | | 5/1997 |

* cited by examiner

Primary Examiner—Ankur Parekh
(74) Attorney, Agent, or Firm—Kathryn A. Marra

(57) ABSTRACT

A family of power transmissions has a plurality of family members each of which have three planetary gearsets, each having three members, and six torque transmitting mechanisms. An output shaft is continuously interconnected with at least one planetary member. An input shaft is selectively interconnected with respective planetary members through at least two of the torque transmitting mechanisms. One member of the second planetary gearset and one member of the third planetary gearset are continuously interconnected, and another member of the third planetary gearset is continuously interconnected with a transmission housing. The remaining torque transmitting mechanisms provide selective interconnections between two planetary members or between a planetary member and the housing, the input shaft, and the output shaft. The torque transmitting mechanisms are selectively engaged in combinations of four to establish at least seven forward speeds and one reverse speed.

4 Claims, 19 Drawing Sheets

| | Ratios | 50 | 52 | 54 | 56 | 58 | 60 |
|---|---|---|---|---|---|---|---|
| Reverse | -8.09 | | X | X | X | | X |
| Neutral | 0.00 | | X | X | | | X |
| 1 | 4.81 | | X | X | | X | X |
| 2 | 2.74 | | X | X | X | X | |
| 3 | 1.57 | X | X | X | | X | |
| 4 | 1.00 | X | | X | X | X | |
| 5 | 0.82 | X | X | | X | X | |
| 6 | 0.75 | X | | | X | X | X |
| 7 | 0.65 | X | X | | | X | X |

(X = engaged)

Ring Gear/Sun Gear Tooth Ratios: $\frac{R1}{S1}=2.95, \frac{R2}{S2}=1.68, \frac{R3}{S3}=1.74$

| Ratio Spread | 7.44 |
|---|---|
| Ratio Steps | |
| Rev/1 | -1.68 |
| 1/2 | 1.76 |
| 2/3 | 1.75 |
| 3/4 | 1.57 |
| 4/5 | 1.22 |
| 5/6 | 1.10 |
| 6/7 | 1.16 |

| | Ratios | 150 | 152 | 154 | 156 | 158 | 160 |
|---|---|---|---|---|---|---|---|
| Reverse | -2.95 | | X | X | X | | X |
| Neutral | 0.00 | | X | X | | | X |
| 1 | 4.56 | | X | X | | X | X |
| 2 | 2.14 | | X | X | X | X | |
| 3 | 1.58 | X | X | X | | X | |
| 4 | 1.29 | X | | X | X | X | |
| 5 | 1.00 | X | X | | X | X | |
| 6 | 0.75 | X | | | X | X | X |
| 7 | 0.64 | X | X | | | X | X |

(X = engaged)

Ring Gear/Sun Gear Tooth Ratios: $\frac{R1}{S1}=2.95, \frac{R2}{S2}=1.54, \frac{R3}{S3}=1.52$

| Ratio Spread | 7.10 |
|---|---|
| Ratio Steps | |
| Rev/1 | -0.65 |
| 1/2 | 2.13 |
| 2/3 | 1.35 |
| 3/4 | 1.23 |
| 4/5 | 1.29 |
| 5/6 | 1.34 |
| 6/7 | 1.16 |

| | Ratios | 250 | 252 | 254 | 256 | 258 | 260 |
|---|---|---|---|---|---|---|---|
| Reverse | -2.70 | X | | | X | X | X |
| Neutral | 0.00 | X | | | | X | X |
| 1 | 4.48 | X | | X | | X | X |
| 2 | 2.97 | | X | X | | X | X |
| 3 | 1.90 | X | X | X | | X | |
| 4 | 1.53 | | X | X | X | X | |
| 5 | 1.00 | X | X | X | X | | |
| 6 | 0.66 | | X | X | X | | X |
| 7 | 0.59 | X | X | | X | | X |

(X = engaged)

Ring Gear/Sun Gear Tooth Ratios: $\frac{R1}{S1}=2.70, \frac{R2}{S2}=1.97, \frac{R3}{S3}=1.89$

| Ratio Spread | 7.59 |
|---|---|
| Ratio Steps | |
| Rev/1 | -0.60 |
| 1/2 | 1.51 |
| 2/3 | 1.56 |
| 3/4 | 1.24 |
| 4/5 | 1.53 |
| 5/6 | 1.51 |
| 6/7 | 1.12 |

| | Ratios | 350 | 352 | 354 | 356 | 358 | 360 |
|---|---|---|---|---|---|---|---|
| Reverse | -2.53 | | X | X | X | | X |
| Neutral | 0.00 | | X | X | | | X |
| 1 | 3.90 | | X | X | | X | X |
| 2 | 1.65 | | X | X | X | X | |
| 3 | 1.20 | X | X | X | | X | |
| 4 | 1.00 | X | | X | X | X | |
| 5 | 0.79 | X | X | | | X | X |
| 6 | 0.61 | X | | | X | X | X |
| 7 | 0.52 | X | X | | | | X |

(X = engaged)

Ring Gear/Sun Gear Tooth Ratios: $\frac{R1}{S1}=1.53, \frac{R2}{S2}=1.54, \frac{R3}{S3}=1.53$

| Ratio Spread | 7.44 |
|---|---|
| Ratio Steps | |
| Rev/1 | -0.65 |
| 1/2 | 2.36 |
| 2/3 | 1.38 |
| 3/4 | 1.20 |
| 4/5 | 1.26 |
| 5/6 | 1.31 |
| 6/7 | 1.16 |

| | Ratios | 450 | 452 | 454 | 456 | 458 | 460 |
|---|---|---|---|---|---|---|---|
| Reverse | -2.95 | X | | X | X | | X |
| Neutral | 0.00 | X | | | X | | X |
| 1 | 4.55 | X | | | X | X | X |
| 2 | 2.12 | X | | X | X | X | |
| 3 | 1.57 | X | X | | X | X | |
| 4 | 1.28 | | X | | X | X | |
| 5 | 1.00 | X | X | X | | X | |
| 6 | 0.75 | | X | X | | X | X |
| 7 | 0.64 | X | X | | | X | X |

*(X = engaged)*

Ring Gear/Sun Gear Tooth Ratios: $\frac{R1}{S1}=1.54, \frac{R2}{S2}=2.95, \frac{R3}{S3}=1.53$

| Ratio Spread | 7.09 |
|---|---|
| Ratio Steps | |
| Rev/1 | -0.65 |
| 1/2 | 2.14 |
| 2/3 | 1.35 |
| 3/4 | 1.23 |
| 4/5 | 1.28 |
| 5/6 | 1.34 |
| 6/7 | 1.16 |

| | Ratios | 550 | 552 | 554 | 556 | 558 | 560 |
|---|---|---|---|---|---|---|---|
| Reverse | -2.95 | | X | X | X | | X |
| Neutral | 0.00 | | X | X | | | X |
| 1 | 4.53 | | X | X | | X | X |
| 2 | 3.13 | X | | X | | X | X |
| 3 | 2.12 | X | X | X | | X | |
| 4 | 1.65 | X | | X | X | X | |
| 5 | 1.00 | X | X | | X | X | |
| 6 | 0.69 | X | | | X | X | X |
| 7 | 0.63 | X | X | | X | | X |

(X = engaged)

Ring Gear/Sun Gear Tooth Ratios: $\frac{R1}{S1}=2.24, \frac{R2}{S2}=2.95, \frac{R3}{S3}=1.53$

| Ratio Spread | 7.24 |
|---|---|
| Ratio Steps | |
| Rev/1 | -0.65 |
| 1/2 | 1.45 |
| 2/3 | 1.47 |
| 3/4 | 1.28 |
| 4/5 | 1.65 |
| 5/6 | 1.45 |
| 6/7 | 1.10 |

| | Ratios | 650 | 652 | 654 | 656 | 658 | 660 |
|---|---|---|---|---|---|---|---|
| Reverse | -2.99 | X | | X | X | | X |
| Neutral | 0.00 | X | | | X | | X |
| 1 | 7.10 | X | | | X | X | X |
| 2 | 3.40 | X | | X | | X | X |
| 3 | 2.53 | | X | X | | X | X |
| 4 | 1.96 | X | X | X | | X | |
| 5 | 1.69 | X | X | | X | X | |
| 6 | 1.58 | | X | X | X | X | |
| 7 | 1.00 | X | | X | X | X | |

(X = engaged)

Ring Gear/Sun Gear Tooth Ratios: $\frac{R1}{S1}=2.99, \frac{R2}{S2}=1.54, \frac{R3}{S3}=1.72$

| Ratio Spread | 7.10 |
|---|---|
| Ratio Steps | |
| Rev/1 | -0.42 |
| 1/2 | 2.09 |
| 2/3 | 1.34 |
| 3/4 | 1.29 |
| 4/5 | 1.16 |
| 5/6 | 1.07 |
| 6/7 | 1.58 |

| | Ratios | 750 | 752 | 754 | 756 | 758 | 760 |
|---|---|---|---|---|---|---|---|
| Reverse | -2.95 | | X | X | X | | X |
| Neutral | 0.00 | | X | X | | | X |
| 1 | 4.56 | | X | X | | X | X |
| 2 | 2.14 | | X | X | X | X | |
| 3 | 1.58 | X | X | X | | X | |
| 4 | 1.29 | X | | X | X | X | |
| 5 | 1.00 | X | X | | X | X | |
| 6 | 0.75 | X | | | X | X | X |
| 7 | 0.64 | X | X | | | X | X |

(X = engaged)

Ring Gear/Sun Gear Tooth Ratios: $\frac{R1}{S1}=2.95, \frac{R2}{S2}=1.54, \frac{R3}{S3}=1.52$

| Ratio Spread | 7.10 |
|---|---|
| Ratio Steps | |
| Rev/1 | -0.65 |
| 1/2 | 2.13 |
| 2/3 | 1.35 |
| 3/4 | 1.23 |
| 4/5 | 1.29 |
| 5/6 | 1.34 |
| 6/7 | 1.16 |

| | Ratios | 850 | 852 | 854 | 856 | 858 | 860 |
|---|---|---|---|---|---|---|---|
| Reverse | -6.05 | X | | X | | X | X |
| Neutral | 0.00 | | | X | | | X |
| 1 | 3.95 | | X | X | X | | X |
| 2 | 2.69 | | X | X | X | X | |
| 3 | 1.81 | X | X | X | X | | |
| 4 | 1.48 | X | | X | X | X | |
| 5 | 1.00 | X | X | | X | X | |
| 6 | 0.77 | X | X | | X | | X |
| 7 | 0.72 | X | | | X | X | X |

(X = engaged)

Ring Gear/Sun Gear Tooth Ratios: $\frac{R1}{S1}=2.53, \frac{R2}{S2}=1.52, \frac{R3}{S3}=2.95$

| Ratio Spread | 5.51 |
|---|---|
| Ratio Steps | |
| Rev/1 | -1.53 |
| 1/2 | 1.47 |
| 2/3 | 1.49 |
| 3/4 | 1.22 |
| 4/5 | 1.48 |
| 5/6 | 1.29 |
| 6/7 | 1.08 |

| | Ratios | 950 | 952 | 954 | 956 | 958 | 960 |
|---|---|---|---|---|---|---|---|
| Reverse | -2.96 | X | | | X | X | X |
| Neutral | 0.00 | X | | | X | | X |
| 1 | 4.93 | X | | X | X | | X |
| 2 | 2.56 | X | | X | | X | X |
| 3 | 1.39 | | X | X | | X | X |
| 4 | 1.16 | | X | X | X | X | |
| 5 | 1.00 | X | X | X | X | | |
| 6 | 0.78 | X | X | | X | X | |
| 7 | 0.64 | X | X | | X | | X |

(X = engaged)

Ring Gear/Sun Gear Tooth Ratios: $\frac{R1}{S1}=2.96, \frac{R2}{S2}=1.52, \frac{R3}{S3}=2.53$

| Ratio Spread | 7.76 |
|---|---|
| Ratio Steps | |
| Rev/1 | -0.60 |
| 1/2 | 1.92 |
| 2/3 | 1.84 |
| 3/4 | 1.21 |
| 4/5 | 1.16 |
| 5/6 | 1.27 |
| 6/7 | 1.23 |

|  | Ratios | 1050 | 1052 | 1054 | 1056 | 1058 | 1060 |
|---|---|---|---|---|---|---|---|
| Reverse | -1.83 | X |  |  | X | X | X |
| Neutral | 0.00 | X |  |  |  | X | X |
| 1 | 4.37 | X |  | X |  | X | X |
| 2 | 2.92 |  | X | X |  | X | X |
| 3 | 1.63 | X | X | X |  | X |  |
| 4 | 1.34 |  | X | X | X | X |  |
| 5 | 1.00 | X | X | X | X |  |  |
| 6 | 0.67 |  | X | X | X |  | X |
| 7 | 0.57 | X | X |  | X |  | X |

(X = engaged)

Ring Gear/Sun Gear Tooth Ratios: $\frac{R1}{S1}=1.83, \frac{R2}{S2}=1.97, \frac{R3}{S3}=2.99$

| Ratio Spread | 7.70 |
|---|---|
| Ratio Steps |  |
| Rev/1 | -0.42 |
| 1/2 | 1.49 |
| 2/3 | 1.79 |
| 3/4 | 1.22 |
| 4/5 | 1.34 |
| 5/6 | 1.49 |
| 6/7 | 1.18 |

| | Ratios | 1150 | 1152 | 1154 | 1156 | 1158 | 1160 |
|---|---|---|---|---|---|---|---|
| Reverse | -2.13 | | X | X | X | | X |
| Neutral | 0.00 | | X | X | | | X |
| 1 | 5.14 | | X | X | | X | X |
| 2 | 2.28 | X | | X | | X | X |
| 3 | 1.67 | X | X | X | | X | |
| 4 | 1.37 | X | | X | X | X | |
| 5 | 1.00 | X | | X | X | | X |
| 6 | 0.69 | X | | | X | X | X |
| 7 | 0.60 | X | X | | X | | X |

(X = engaged)

Ring Gear/Sun Gear Tooth Ratios: $\frac{R1}{S1} = 2.24, \frac{R2}{S2} = 2.67, \frac{R3}{S3} = 2.13$

| Ratio Spread | 8.52 |
|---|---|
| Ratio Steps | |
| Rev/1 | -0.41 |
| 1/2 | 2.26 |
| 2/3 | 1.37 |
| 3/4 | 1.21 |
| 4/5 | 1.37 |
| 5/6 | 1.45 |
| 6/7 | 1.15 |

| | Ratios | 1250 | 1252 | 1254 | 1256 | 1258 | 1260 |
|---|---|---|---|---|---|---|---|
| Reverse | -2.70 | X | | X | X | | X |
| Neutral | 0.00 | X | | | X | | X |
| 1 | 3.83 | X | | | X | X | X |
| 2 | 2.72 | X | | X | X | X | |
| 3 | 1.83 | X | X | | X | X | |
| 4 | 1.47 | | X | X | X | X | |
| 5 | 1.00 | X | X | X | X | | |
| 6 | 0.61 | X | X | X | | | X |
| 7 | 0.49 | X | X | | X | | X |

(X = engaged)

Ring Gear/Sun Gear Tooth Ratios: $\frac{R1}{S1} = 2.70, \frac{R2}{S2} = 2.54, \frac{R3}{S3} = 2.15$

| Ratio Spread | 7.86 |
|---|---|
| Ratio Steps | |
| Rev/1 | -0.70 |
| 1/2 | 1.41 |
| 2/3 | 1.48 |
| 3/4 | 1.25 |
| 4/5 | 1.47 |
| 5/6 | 1.64 |
| 6/7 | 1.25 |

| | Ratios | 1350 | 1352 | 1354 | 1356 | 1358 | 1360 |
|---|---|---|---|---|---|---|---|
| Reverse | -1.97 | X | | X | X | X | |
| Neutral | 0.00 | X | | X | X | | |
| 1 | 2.96 | X | | X | X | | X |
| 2 | 1.66 | X | X | | X | | X |
| 3 | 1.22 | | X | X | X | | X |
| 4 | 1.00 | X | X | X | X | | |
| 5 | 0.66 | | X | X | X | X | |
| 6 | 0.50 | X | X | X | | X | |
| 7 | 0.34 | | X | X | | X | X |

*(X = engaged)*

Ring Gear/Sun Gear Tooth Ratios: $\frac{R1}{S1}=2.96, \frac{R2}{S2}=1.97, \frac{R3}{S3}=1.52$

| Ratio Spread | 8.74 |
|---|---|
| Ratio Steps | |
| Rev/1 | -0.66 |
| 1/2 | 1.78 |
| 2/3 | 1.36 |
| 3/4 | 1.22 |
| 4/5 | 1.50 |
| 5/6 | 1.33 |
| 6/7 | 1.48 |

| | Ratios | 1450 | 1452 | 1454 | 1456 | 1458 | 1460 |
|---|---|---|---|---|---|---|---|
| Reverse | -2.47 | | X | X | X | X | |
| Neutral | 0.00 | | X | X | | X | |
| 1 | 5.01 | | X | X | | X | X |
| 2 | 2.24 | X | | X | | X | X |
| 3 | 1.69 | X | X | X | | X | |
| 4 | 1.00 | X | X | X | X | | |
| 5 | 0.80 | X | X | | X | | X |
| 6 | 0.69 | X | | | X | X | X |
| 7 | 0.61 | X | X | | X | X | |

(X = engaged)

Ring Gear/Sun Gear Tooth Ratios: $\frac{R1}{S1} = 2.24, \frac{R2}{S2} = 1.54, \frac{R3}{S3} = 2.47$

| Ratio Spread | 8.16 |
|---|---|
| Ratio Steps | |
| Rev/1 | -0.49 |
| 1/2 | 2.24 |
| 2/3 | 1.33 |
| 3/4 | 1.69 |
| 4/5 | 1.25 |
| 5/6 | 1.16 |
| 6/7 | 1.13 |

| | Ratios | 1550 | 1552 | 1554 | 1556 | 1558 | 1560 |
|---|---|---|---|---|---|---|---|
| Reverse | -1.34 | X | X | X | | X | |
| Neutral | 0.00 | X | | | | X | |
| 1 | 2.44 | X | | | X | X | X |
| 2 | 1.56 | X | | X | | X | X |
| 3 | 1.00 | X | X | X | | | X |
| 4 | 0.81 | | X | X | | X | X |
| 5 | 0.52 | | X | | X | X | X |
| 6 | 0.39 | | X | X | X | X | |
| 7 | 0.34 | X | X | | X | X | |

(X = engaged)

Figure 32 Ring Gear/Sun Gear Tooth Ratios: $\frac{R1}{S1}=2.99, \frac{R2}{S2}=1.52, \frac{R3}{S3}=1.54$

| Ratio Spread | 7.26 |
|---|---|
| Ratio Steps | |
| Rev/1 | -0.55 |
| 1/2 | 1.56 |
| 2/3 | 1.56 |
| 3/4 | 1.23 |
| 4/5 | 1.56 |
| 5/6 | 1.32 |
| 6/7 | 1.17 |

| | Ratios | 1650 | 1652 | 1654 | 1656 | 1658 | 1660 |
|---|---|---|---|---|---|---|---|
| Reverse | -1.15 | X | X | | X | | X |
| Neutral | 0.00 | | X | | | | X |
| 1 | 2.44 | | X | X | | X | X |
| 2 | 1.58 | | X | X | X | | X |
| 3 | 1.00 | X | X | X | X | | |
| 4 | 0.80 | X | | X | X | | X |
| 5 | 0.51 | X | | X | | X | X |
| 6 | 0.39 | X | | | X | X | X |
| 7 | 0.34 | X | X | | | X | X |

(X = engaged)

Figure 34  Ring Gear/Sun Gear Tooth Ratios: $\frac{R1}{S1}=1.72, \frac{R2}{S2}=2.94, \frac{R3}{S3}=1.51$

| Ratio Spread | 7.29 |
|---|---|
| Ratio Steps | |
| Rev/1 | -0.47 |
| 1/2 | 1.55 |
| 2/3 | 1.58 |
| 3/4 | 1.24 |
| 4/5 | 1.58 |
| 5/6 | 1.31 |
| 6/7 | 1.16 |

| | Ratios | 1750 | 1752 | 1754 | 1756 | 1758 | 1760 |
|---|---|---|---|---|---|---|---|
| Reverse | -1.01 | X | X | X | | X | |
| Neutral | 0.00 | X | | | | X | |
| 1 | 2.51 | X | | | X | X | X |
| 2 | 1.62 | X | | X | X | X | |
| 3 | 1.00 | X | X | X | X | | |
| 4 | 0.79 | | X | X | X | X | |
| 5 | 0.49 | | X | | X | X | X |
| 6 | 0.37 | | X | X | | X | X |
| 7 | 0.32 | X | X | | | X | X |

(X = engaged)

Figure 36  Ring Gear/Sun Gear Tooth Ratios: $\frac{R1}{S1}=2.96, \frac{R2}{S2}=1.54, \frac{R3}{S3}=1.67$

| Ratio Spread | 7.95 |
|---|---|
| Ratio Steps | |
| Rev/1 | -0.40 |
| 1/2 | 1.55 |
| 2/3 | 1.62 |
| 3/4 | 1.26 |
| 4/5 | 1.62 |
| 5/6 | 1.33 |
| 6/7 | 1.17 |

|  | Ratios | 1850 | 1852 | 1854 | 1856 | 1858 | 1860 |
|---|---|---|---|---|---|---|---|
| Reverse | -7.79 | X |  | X | X | X |  |
| Neutral | 0.00 | X |  | X | X |  |  |
| 1 | 3.96 | X |  | X | X |  | X |
| 2 | 2.18 | X |  |  | X | X | X |
| 3 | 1.00 | X | X |  | X |  | X |
| 4 | 0.67 | X | X | X |  |  | X |
| 5 | 0.60 |  | X | X |  | X | X |
| 6 | 0.57 | X | X | X |  | X |  |
| 7 | 0.50 | X | X |  |  | X | X |

(X = engaged)

Ring Gear/Sun Gear Tooth Ratios: $\frac{R1}{S1}=2.96, \frac{R2}{S2}=1.97, \frac{R3}{S3}=1.52$

| Ratio Spread | 7.90 |
|---|---|
| Ratio Steps |  |
| Rev/1 | -1.97 |
| 1/2 | 1.82 |
| 2/3 | 2.18 |
| 3/4 | 1.49 |
| 4/5 | 1.11 |
| 5/6 | 1.05 |
| 6/7 | 1.14 |

US 6,776,738 B2

FAMILY OF MULTI-SPEED TRANSMISSIONS WITH A STATIONARY PLANETARY MEMBER AND INPUT CLUTCHES

TECHNICAL FIELD

This invention relates to multi-speed planetary transmissions and, more particularly, to a family of multi-speed planetary transmissions having six torque-transmitting mechanisms, and three planetary gearsets to produce a minimum of seven forward speed ratios and one reverse speed ratio.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four-speed transmissions. Seven-speed transmissions offer further vehicle acceleration performance and fuel economy improvements over five- and six-speed transmissions. However, seven-speed power transmissions have not been proposed due to the complexity of these assemblies, as well as size and cost. There are many current patents that describe five- and six-speed power transmissions. Some of the six-speed power transmission patents, especially those assigned to the assignee of the present invention, describe six-speed power transmissions in families, wherein one or more family members incorporate a limited number of seven-speed power transmissions.

SUMMARY OF THE INVENTION

It is an object of the present invention to provide an improved family of multi-speed transmissions providing at least seven forward speeds.

In one aspect of the present invention, each family member includes three planetary gearsets and each planetary gearset has three planetary members.

In another aspect of the present invention, each family member has six torque-transmitting mechanisms represented by five rotating type torque-transmitting mechanisms and one torque-transmitting mechanism that is either of the rotating type or the stationary type.

In yet another aspect of the present invention, members of the first planetary gearset are not continuously interconnected with members of the second or third planetary gearsets.

In yet another aspect of the present invention, a first member of the second planetary gearset and a first member of the third planetary gearset are continuously interconnected by an interconnecting member.

In yet still another aspect of the present invention, a second member of the third planetary gearset is continuously connected with a transmission housing.

In still another aspect of the present invention, the output shaft is continuously interconnected with at least one member of the planetary gearsets.

In still another aspect of the present invention, the input shaft is not continuously interconnected with any member of the planetary gearsets.

In still another aspect of the present invention, at least two of the torque-transmitting mechanisms operate as input clutches that are selectively connectible between the input shaft of the transmission and at least one member of one of the planetary gearsets.

In yet another aspect of the present invention, a third of the torque-transmitting mechanisms interconnects a member of one of the planetary gearsets with the output shaft, or another member of one of the planetary gearsets.

In a further aspect of the present invention, a fourth of the torque-transmitting mechanisms selectively interconnects a member of the first planetary gearset with a member of the second or third planetary gearset.

In a yet further aspect of the present invention, a fifth of the torque-transmitting mechanisms selectively connects a member of the first or second planetary gearset with another member of one of the planetary gearsets.

In a still further aspect of the present invention, a sixth of the torque-transmitting mechanisms selectively interconnects a member of one of the planetary gearsets with either another member of one of the planetary gearsets or with the transmission housing.

In yet still a further aspect of the present invention, the six torque-transmitting mechanisms are selectively engaged in combinations of four to establish at least seven forward speed ratios and one reverse speed ratio between the input shaft and the output shaft of the transmission.

The present invention is represented in a family of planetary transmissions that are low content seven speed mechanisms in that only three planetary gearsets and six torque-transmitting mechanisms are needed to establish these seven forward speed ratios. Each of the planetary gearsets has a sun gear member, a ring gear member, and a planet carrier assembly member. One defining feature of the transmission family members is that a member of one of the planetary gearsets is continuously interconnected with a member of another planetary gearset. Further, a member of one of the planetary gearsets having an interconnected member also has a member continuously connected to a transmission housing.

The family of transmissions is further defined in that at least one member of one of the planetary gearsets is continuously interconnected with the transmission output shaft and the transmission input shaft is only selectively connectible with members of the planetary gearsets through two independently selectively engageable torque-transmitting mechanisms. Four remaining torque-transmitting mechanisms provide selective interconnections either between the planetary members of at least two of the planetary gearsets, or between planetary gear members and the transmission housing. The six torque-transmitting mechanisms are selectively engageable in combinations of four to establish at least seven forward speed ratios as well as at least one reverse speed ratio. An attractive feature of this family of transmissions is that by engaging four torque transmitting mechanisms for each speed ratio only two torque transmitting mechanisms remain open which minimizes the spin loss of the transmission.

DESCRIPTION OF THE DRAWINGS

FIG. 32 is a truth table and chart representing some of the operating parameters of the embodiment shown in FIG. 31.

FIG. 34 is a truth table and chart representing some of the operating parameters of the embodiment shown in FIG. 33.

FIG. 36 is a truth table and chart representing some of the operating parameters of the embodiment shown in FIG. 35.

DESCRIPTION OF THE EXEMPLARY EMBODIMENTS

Figures 1, 2:
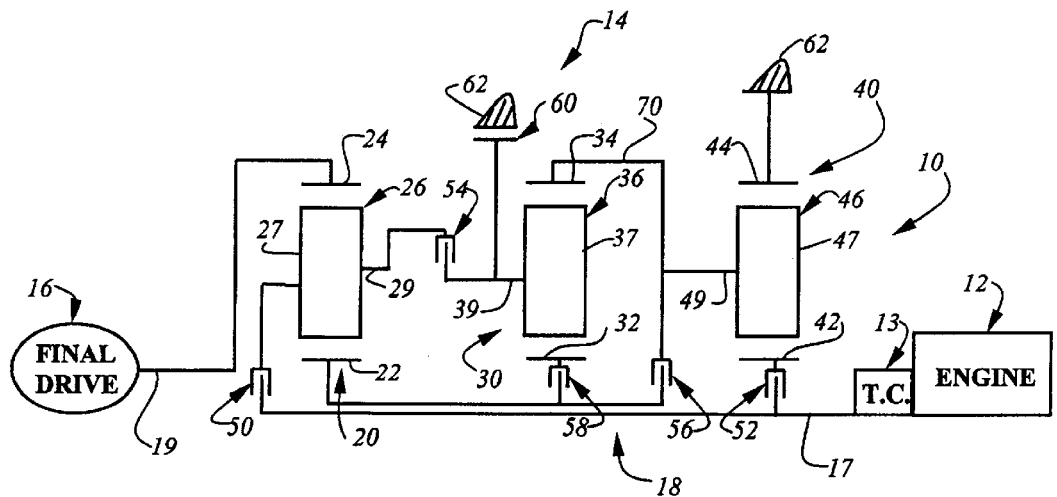
FIG. 1 is a schematic representation of a powertrain incorporating one embodiment of the present invention.
FIG. 2 is a truth table and chart representing some of the operating parameters of the present invention.

Referring to the drawings, wherein like characters represent the same or corresponding parts throughout the several views, there is seen in FIG. 1 a powertrain 10 having a conventional engine or prime mover 12, a conventional torque converter or starting device 13, a planetary transmission 14, and a conventional final drive mechanism 16. The planetary transmission 14 includes an input shaft 17, a planetary gear arrangement 18, and an output shaft 19. The final drive mechanism 16 is connected with the drive wheels of a vehicle, not shown.

The planetary gear arrangement 18 includes three planetary gearsets 20, 30 and 40 and six torque-transmitting mechanisms 50, 52, 54, 56, 58, and 60. The torque-transmitting mechanisms are conventional fluid-operated frictionally engaged torque-transmitting mechanisms, which are well known in the art. The torque-transmitting mechanisms 50, 52, 54, 56, and 58 are shown as rotating type torque-transmitting mechanisms, commonly termed clutches, and the torque-transmitting mechanism 60 is shown as a stationary type torque-transmitting mechanism, commonly termed a brake. The rotating type torque-transmitting mechanisms are generally multiple disc type mechanisms, which are engaged through a fluid-operated piston. The stationary type torque-transmitting mechanism may be either of the band type, which is selectively controlled through a fluid-operated servo mechanism, or a disc type friction brake, which is operated by a fluid controlled piston.

The planetary gearset 20 includes a sun gear member 22, a ring gear member 24, and a planet carrier assembly member 26. The planet carrier assembly member 26 includes a plurality of pinion gears 27 rotatably mounted on a planet carrier member 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 rotatably mounted on a planet carrier member 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a planet carrier member 49 and disposed in meshing relationship with both the sun gear member 42 and the ring gear member 44.

Each of the planetary gearsets 20, 30, and 40 are shown with a single pinion gear member, however, as is well known, the planet carrier of each of these planet carrier assembly members will have equally spaced thereon a plurality of pinion gear members, generally three or four. Also, the planetary gearsets 20, 30, and 40 are shown as simple or single pinion type planetary gearsets, which are represented by the feature that if the planet carrier member is held stationary, the sun gear member and ring gear member will rotate in opposite directions.

The ring gear member 34 is continuously interconnected with the planet carrier assembly member 46 through an interconnecting member 70. The ring gear member 44 is continuously interconnected with a stationary component, such as a transmission housing 62. The output shaft 19 is continuously connected with the ring gear member 24.

The input shaft 17 is selectively connectible with the planet carrier assembly member 26 through the torque-transmitting mechanism 50 and selectively connectible with the sun gear member 42 through the torque-transmitting mechanism 52. The planet carrier assembly member 26 is selectively connectible with the planet carrier assembly member 36 through the torque-transmitting mechanism 54. The sun gear member 22 is selectively interconnectible with the sun gear member 32 through the torque-transmitting mechanism 58. The sun gear member 22 is selectively connectible with the interconnecting member 70 through the torque-transmitting mechanism 56. The planet carrier assembly member 36 is selectively connectible with the transmission housing 62 through the torque-transmitting mechanism 60.

As shown in the truth table of FIG. 2, the torque-transmitting mechanisms are selectively engaged in combinations four to establish a reverse speed ratio and seven forward speed ratios between the input shaft 17 and the output shaft 19 through the planetary gear arrangement 18. The truth table of FIG. 2 also provides a numerical example of speed ratios that are available with the planetary gear arrangement 18 when the ring gear/sun gear tooth ratios of the planetary gearsets 20, 30, and 40 are given as represented by R1/S1, R2/S2, and R3/S3, respectively. Also found in FIG. 2 is a chart which provides a numerical example for the ratio steps between adjacent forward speed ratios as well as between the reverse and first forward speed ratio.

The chart also provides the numerical value for the overall ratio spread of the forward speed ratios. Noting that this ratio spread is relatively high, for example 7.44, indicates that the starting device 13 may be other than a torque converter. It might be, for example, an automatically engaging clutch. In the alternative, the torque-transmitting mechanisms 50, 54, and 56 might be designed to be starting mechanisms or launch mechanisms for the powertrain.

The reverse speed ratio is established with the engagement of the torque-transmitting mechanisms 52, 54, 56, and 60. During the reverse speed ratio, the planet carrier assembly member 46, ring gear member 34, and sun gear member 22 are rotated at a speed determined by the speed of the sun gear member 42 and the ring gear/sun gear tooth ratio of the planetary gearset 40. The ring gear member 24 and therefore output shaft 19 are rotated at a speed determined by the speed of the sun gear member 22 and the ring gear/sun gear tooth ratio of the planetary gearset 20. The numerical value of the reverse speed ratio is determined by the ring gear/sun gear tooth ratios of the planetary gearsets 20 and 40.

The first forward speed ratio is established with the engagement of the torque-transmitting mechanisms 52, 54, 58, and 60. It should be noted that a reverse to first forward speed ratio is interchanged by swapping the torque-transmitting mechanisms 56 and 58. This is a simplified torque-transmitting mechanism interchange, commonly termed a single transition interchange for single transition shift. During the first forward speed ratio, the planet carrier assembly member 46 and ring gear member 34 are rotated at a speed determined by the speed of the sun gear member 42 and the ring gear/sun gear tooth ratio of the planetary gearset 40. The sun gear members 32 and 22 are rotated at a speed determined by the speed of the ring gear member 34 and the ring gear/sun gear tooth ratio of the planetary gearset 30. The ring gear member 24 and therefore output shaft 19 are rotated at a speed determined by the speed of the sun gear member 22 and the ring gear/sun gear tooth ratio of the planetary gearset 20. The numerical value of the first forward speed ratio is determined by the ring gear/sun gear tooth ratios of all three planetary gearsets 20, 30, and 40.

The second forward speed ratio is established with the engagement of the torque-transmitting mechanisms 52, 54, 56, and 58. It should be noted that the 1–2 interchange is a single transition interchange in that only the torque-transmitting mechanisms 56 and 60 are swapped. During the second forward speed ratio, the planetary gearsets 20 and 30 rotate in unison. The planet carrier assembly member 46, the planetary gearsets 30 and 20, and the output shaft 19 rotate at a speed determined by the speed of the input shaft 17, the speed of the sun gear member 42, and the ring gear/sun gear tooth ratio of the planetary gearset 40. The numerical value of the second forward speed ratio is determined by the ring gear/sun gear tooth ratio of the planetary gearset 40.

The third forward speed ratio is established with the engagement of the torque-transmitting mechanisms 50, 52, 54, and 58. It should be noted that the 2–3 interchange is also of the single transition variety. During the third forward speed ratio, the planet carrier assembly member 46 and ring gear member 34 are rotated at a speed determined by the speed of the sun gear member 42 and the ring gear/sun gear tooth ratio of the planetary gearset 40. The sun gear members 32 and 22 are rotated at a speed determined by the speed of the ring gear member 34, the speed of the planet carrier assembly member 36, and the ring gear/sun gear tooth ratio of the planetary gearset 30. The ring gear member 24 and therefore output shaft 19 are rotated at a speed determined by the speed of the sun gear member 22, the speed of the planet carrier assembly member 26, and the ring gear/sun gear tooth ratio of the planetary gearset 20. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 50, 54, 56, and 58. The 3–4 interchange is of the single transition variety. During the fourth forward speed ratio, the planetary gearsets 20 and 30 rotate in unison with the input shaft 17. Therefore, the input shaft 17 and output shaft 19 rotate in unison and the numerical value of the fourth forward speed ratio is one.

The fifth forward speed ratio is established with the engagement of the torque-transmitting mechanisms 50, 52, 56, and 58. The 4–5 interchange is a single transition interchange. During the fifth forward speed ratio, the planet carrier assembly member 46 and the sun gear member 22 are rotated at a speed determined by the speed of the sun gear member 42 and the ring gear/sun gear tooth ratio of the planetary gearset 40. The ring gear member 24 and therefore output shaft 19 are rotated at a speed determined by the speed of the sun gear member 22, the speed of the planet carrier assembly member 26, and the ring gear/sun gear tooth ratio of the planetary gearset 20. The numerical value of the fifth forward speed ratio is determined by the ring gear/sun gear tooth ratios of the planetary gearsets 20 and 40.

The sixth forward speed ratio is established with the engagement of the torque-transmitting mechanisms 50, 56, 58, and 60. The 5–6 interchange is also of the single transition variety. During the sixth forward speed ratio, the planetary gearset 30 and sun gear member 22 are held stationary by the torque-transmitting mechanism 60 and the grounded ring gear member 44. The ring gear member 24 and therefore output shaft 19 are rotated at a speed determined by the speed of the planet carrier assembly member 26 and the ring gear/sun gear tooth ratio of the planetary gearset 20. The numerical value of the sixth forward speed ratio is determined by the ring gear/sun gear tooth ratio of the planetary gearset 20.

The seventh forward speed ratio is established with the engagement of the torque-transmitting mechanisms 50, 52, 58, and 60. The 6–7 interchange is of the single variety. During the seventh forward speed ratio, the planet carrier assembly member 46 and ring gear member 34 are rotated at a speed determined by the speed of the sun gear member 42 and the ring gear/sun gear tooth ratio of the planetary gearset 40. The sun gear members 22 and 32 are rotated at a speed determined by the speed of the ring gear member 34 and the ring gear/sun gear tooth ratio of the planetary gearset 30. The ring gear member 24 and therefore output shaft 19 are rotated at a speed determined by the speed of the sun gear member 22, the speed of the planet carrier assembly member 26, and the ring gear/sun gear tooth ratio of the planetary gearset 20. The numerical value of the seventh forward speed ratio is determined by the ring gear/sun gear tooth ratios of all three planetary gearsets 20, 30, and 40.

Figures 3, 4:
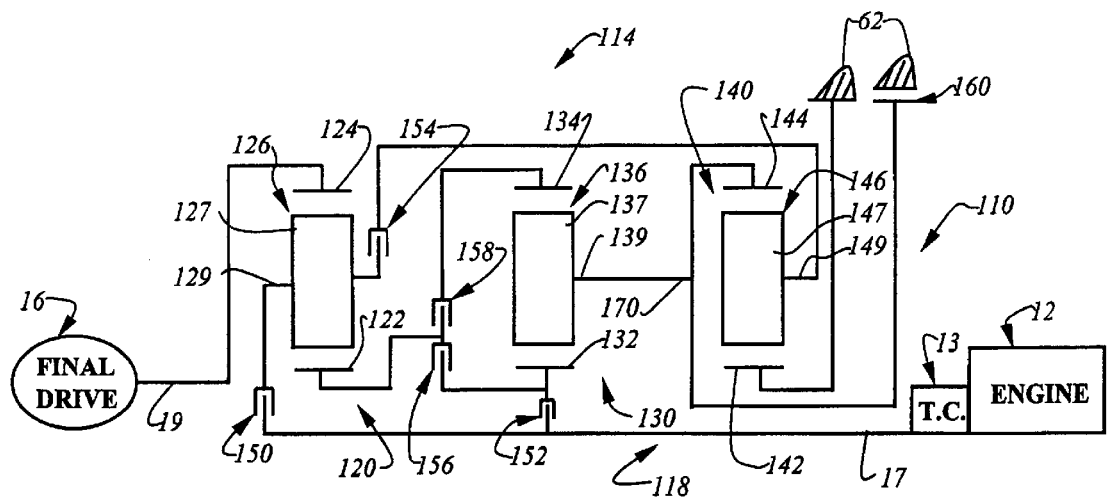
FIG. 3 is a schematic presentation of a powertrain incorporating another embodiment of the present invention.
FIG. 4 is a truth table and chart representing some of the operating parameters of the embodiment shown in FIG. 3.

A powertrain 110, shown in FIG. 3, includes the engine 12, the starting device 13, a planetary transmission 114, and the final drive mechanism 16. The planetary transmission 114 includes the input shaft 17, a planetary gear arrangement 118, and the output shaft 19.

The planetary gear arrangement 118 includes three planetary gearsets 120, 130 and 140 and six torque-transmitting mechanisms 150, 152, 154, 156, 158, and 160. The torque-transmitting mechanism 160 is a stationary type torque-transmitting mechanism while the remaining torque-transmitting mechanisms are of the rotating type torque-transmitting mechanisms The planetary gearset 120 includes a sun gear member 122, a ring gear member 124, and a planet carrier assembly member 126. The planet carrier assembly member 126 includes a plurality of pinion gears 127 rotatably mounted on a planet carrier member 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier member 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier member 149 and disposed in meshing relationship with both the sun gear member 142 and the ring gear member 144.

The planet carrier assembly member 136 is continuously connected with the ring gear member 144 through an interconnecting member 170, which is selectively connectible with the transmission housing 62 through the torque-transmitting mechanism 160. The sun gear member 142 is continuously connected with the transmission housing 62. The ring gear member 124 is continuously connected with the output shaft 19.

The input shaft 17 is selectively connectible with the planet carrier assembly member 126 through the torque-transmitting mechanism 150 and selectively connectible with sun gear member 132 through the torque-transmitting mechanism 152. The sun gear member 122 is selectively connectible with the sun gear member 132 through the torque-transmitting mechanism 156 and selectively connectible with the ring gear member 134 through the torque-transmitting mechanism 158. The planet carrier assembly member 126 and planet carrier assembly member 146 are selectively interconnectible through the torque-transmitting mechanism 154.

As seen in the truth table of FIG. 4, the torque-transmitting mechanisms are selectively engaged in combinations of four to provide a reverse speed ratio and seven forward speed ratios. The truth table also provides a numerical example of the speed ratios that are available with the planetary gear arrangement 118 when the ring gear/sun gear tooth ratios of the planetary gearsets 120, 130, and 140 are as shown in FIG. 4. as R1/S1, R2/S2, and R3/S3, respectively. Also, the information given in FIG. 4 is represented in a chart, which gives the numerical values for the ratio steps between adjacent forward speed ratios as well as between the reverse and first forward speed ratio. This chart also has listed therein the numerical value for the overall ratio spread of the forward speed ratios. It should be noted from reviewing the chart that each of the forward speed interchanges are of the single transition variety and that the reverse-to-first forward interchange can also be of the single transition variety.

To establish the reverse speed ratio, the torque-transmitting mechanisms 152, 154, 156, and 160 are engaged. During the reverse speed ratio, the speed of the ring gear member 124 and therefore output shaft 19 is determined by the speed of the sun gear member 122 and the ring gear/sun gear tooth ratio of the planetary gearset 120. The numerical value of the reverse speed ratio is determined by the ring gear/sun gear tooth ratio of the planetary gearset 120.

The first forward speed ratio is established with the engagement of the torque-transmitting mechanisms 152, 154, 158, and 160. During the first forward speed ratio, the ring gear member 134 and sun gear member 122 are rotated at a speed determined by the speed of the sun gear member 132 and the ring gear/sun gear tooth ratio of the planetary gearset 130. The ring gear member 124 and therefore output shaft 19 are rotated at a speed determined by the speed of the sun gear member 122 and the ring gear/sun gear tooth ratio of the planetary gearset 120. The numerical value of the first forward speed ratio is determined by the ring gear/sun gear tooth ratios of the planetary gearsets 120 and 130.

The second forward speed ratio is established with the engagement of the torque-transmitting mechanisms 152, 154, 156, and 158. During the second forward speed ratio, the planetary gearset 130, the ring gear member 144, and the sun gear member 122 are all rotated in unison with the input shaft 17. The planet carrier assembly member 146 and planet carrier assembly member 126 are rotated at a speed determined by the speed of the ring gear member 144 and the ring gear/sun gear tooth ratio of the planetary gearset 140. The ring gear member 124 and therefore output shaft 19 are rotated at a speed determined by the speed of the planet carrier assembly member 126, the speed of the sun gear member 122, and the ring gear/sun gear tooth ratio of the planetary gearset 120. The numerical value of the second forward speed ratio is determined by the ring gear/sun gear tooth ratios of the planetary gearsets 120 and 140.

The third forward speed ratio is established with the engagement of the torque-transmitting mechanisms 150, 152, 154, and 158. During the third forward speed ratio, the ring gear member 144 and planet carrier assembly member 136 are rotated at a speed determined by the speed of the planet carrier assembly member 146 and the ring gear/sun gear tooth ratio of the planetary gearset 140. The ring gear member 134 and sun gear member 122 are rotated at a speed determined by the speed of the sun gear member 132, the speed of the planet carrier assembly member 136, and the ring gear/sun gear tooth ratio of the planetary gearset 130. The ring gear member 124 and therefore output shaft 19 are rotated at a speed determined by the speed of the sun gear member 122, the speed of the planet carrier assembly member 126, and the ring gear/sun gear tooth ratio of the planetary gearset 120. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 150, 154, 156, and 158. During the fourth forward speed ratio, the ring gear member 144, the planetary gearset 130, and the sun gear member 122 are rotated at a speed determined by the speed of the planet carrier assembly member 146 and the ring gear/sun gear tooth ratio of the planetary gearset 140. The ring gear member 124 and therefore output shaft 19 are rotated at a speed determined by the speed of the planet carrier assembly member 126, the speed of the sun gear member 122, and the ring gear/sun gear tooth ratio of the planetary gearset 120. The numerical value of the fourth forward speed ratio is determined by the ring gear/sun gear tooth ratios of the planetary gearsets 120 and 140.

The fifth forward speed ratio is established with the engagement of the torque-transmitting mechanisms 150, 152, 156, and 158. During the fifth forward speed ratio, the planetary gearsets 120, 130, and output shaft 19 are rotated in unison with the input shaft 17. The numerical value of the fifth forward speed ratio is one.

The sixth forward speed ratio is established with the engagement of the torque-transmitting mechanisms 150, 156, 158, and 160. During the sixth forward speed ratio, the planetary gearsets 140 and 130, as well as the sun gear member 122 are held stationary. The ring gear member 124 and therefore output shaft 19 are rotated at a speed determined by the speed of the planet carrier assembly member 126 and the ring gear/sun gear tooth ratio of the planetary gearset 120. The numerical value of the sixth forward speed ratio is determined by the ring gear/sun gear tooth ratio of the planetary gearset 120.

The seventh forward speed ratio is established with the engagement of the torque-transmitting mechanisms 150, 152, 158, and 160. During the seventh forward speed ratio, the ring gear member 134 and sun gear member 122 are rotated at a speed determined by the speed of the sun gear member 132 and the ring gear/sun gear tooth ratio of the planetary gearset 130. The ring gear member 124 and therefore output shaft 19 are rotated at a speed determined by the speed of the sun gear member 122, the speed of the planet carrier assembly member 126, and the ring gear/sun gear tooth ratio of the planetary gearset 120. The numerical value of the seventh forward speed ratio is determined by the ring gear/sun gear tooth ratios of the planetary gearsets 130 and 120.

Figures 5, 6:
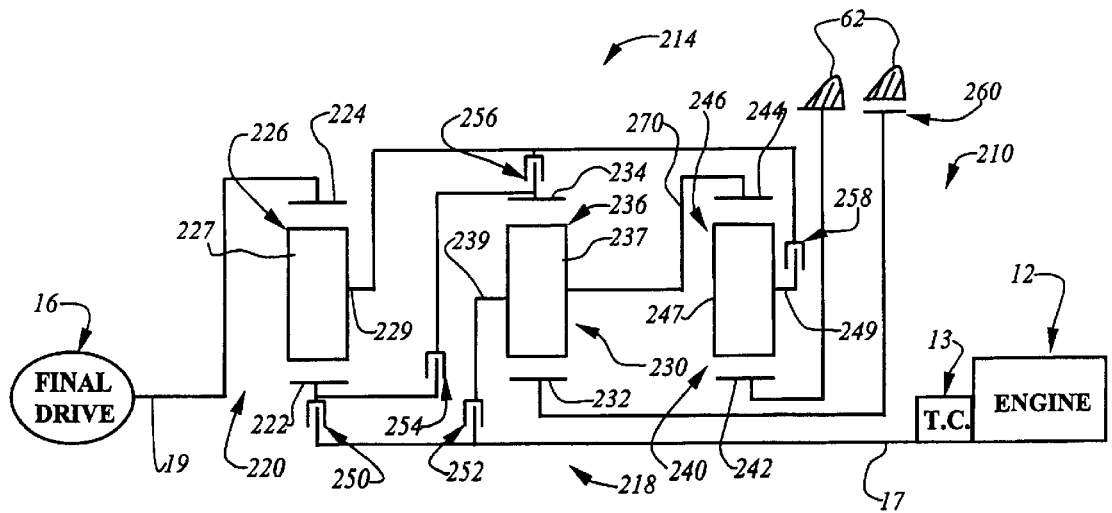
FIG. 5 is a schematic presentation of a powertrain incorporating another embodiment of the present invention.
FIG. 6 is a truth table and chart representing some of the operating parameters of the embodiment shown in FIG. 5.

A powertrain 210, shown in FIG. 5, includes the engine 12, the starting device 13, a planetary transmission 214, and the final drive mechanism 16. The planetary transmission 214 includes the input shaft 17, a planetary gear arrangement 218, and the output shaft 19.

The planetary gear arrangement 218 includes three planetary gearsets 220, 230 and 240 and six torque-transmitting mechanisms 250, 252, 254, 256, 258, and 260. The torque-transmitting mechanism 260 is a stationary type torque-transmitting mechanism while the remaining torque-transmitting mechanisms are of the rotating type torque-transmitting mechanisms The planetary gearset 220 includes a sun gear member 222, a ring gear member 224, and a planet carrier assembly member 226. The planet carrier assembly member 226 includes a plurality of pinion gears 227 rotatably mounted on a planet carrier member 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier member 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier member 249 and disposed in meshing relationship with both the sun gear member 242 and the ring gear member 244.

The planet carrier assembly member 236 is continuously interconnected with the ring gear member 244 through an interconnecting member 270, which is selectively connectible with the input shaft 17 through the torque-transmitting mechanism 252. The sun gear member 242 is continuously connected with the transmission housing 62. The ring gear member 224 is continuously connected with the output shaft 19.

The input shaft 17 is selectively connectible with the sun gear member 222 through the torque-transmitting mechanism 250. The sun gear member 222 and ring gear member 234 are selectively interconnectible through the torque-transmitting mechanism 254. The planet carrier assembly member 226 is selectively connectible with the ring gear member 234 through the torque-transmitting mechanism 256, and with the planet carrier assembly member 246 through the torque-transmitting mechanism 258. The sun gear member 232 is selectively connectible with the transmission housing 62 through the torque-transmitting mechanism 260.

The truth table of FIG. 6 describes the engagement combinations and sequences for the torque-transmitting mechanisms in order to establish seven forward speed ratios and one reverse speed ratio between the input shaft 17 and the output shaft 19 through the planetary gear arrangement 218. The numerical examples for the speed ratios that can be obtained with the planetary gear arrangement 218 are also shown. These numerical values are established utilizing the ring gear/sun gear tooth ratios R1/S1, R2/S2, and R3/S3, which represent the ring gear/sun gear tooth ratios of the planetary gearsets 220, 230, and 240, respectively. A chart in FIG. 6 presents the numerical values for the ratio steps between adjacent forward speed ratios as well as between the reverse and first forward speed ratio. Also provided therein is a numerical value for the overall ratio spread of the forward speed ratios.

The reverse speed ratio is established with the engagement of the torque-transmitting mechanisms 250, 256, 258, and 260. During the reverse speed ratio, the ring gear member 224 and the output shaft 19 are rotated at a speed determined by the speed of the sun gear member 222 and the ring gear/sun gear tooth ratio of the planetary gearset 220. The numerical value of the reverse speed ratio is determined by the ring gear/sun gear tooth ratio of the planetary gearset 220.

The first forward speed ratio is established with the engagement of the torque-transmitting mechanisms 250, 254, 258, and 260. During the first forward speed ratio, the planet carrier assembly member 236 and ring gear member 244 are rotated at a speed determined by the speed of the ring gear member 234 and the ring gear/sun gear tooth ratio of the planetary gearset 230. The planet carrier assembly members 246 and 226 are rotated at a speed determined by the speed of the ring gear member 244 and the ring gear/sun gear tooth ratio of the planetary gearset 240. The ring gear member 224 and therefore output shaft 19 are rotated at a speed determined by the speed of the planet carrier assembly member 226, the speed of the sun gear member 222, and the ring gear/sun gear tooth ratio of the planetary gearset 220. The numerical value of the first forward speed ratio is determined by the ring gear/sun gear tooth ratios of all three planetary gearsets 220, 230, and 240.

The second forward speed ratio is established with the engagement of the torque-transmitting mechanisms 252, 254, 258, and 260. During the second forward speed ratio, the planet carrier assembly members 246 and 226 are rotated at a speed determined by the speed of the ring gear member 244 and the ring gear/sun gear tooth ratio of the planetary gearset 240. The ring gear member 234 and sun gear member 222 are rotated at a speed determined by the speed of the planet carrier assembly member 236 and the ring gear/sun gear tooth ratio of the planetary gearset 230. The ring gear member 224 and therefore output shaft 19 are rotated at a speed determined by the speed of the sun gear member 222, the speed of the planet carrier assembly member 226, and the ring gear/sun gear tooth ratio of the planetary gearset 220. The numerical value of the second forward speed ratio is determined by the ring gear/sun gear tooth ratios of all three planetary gearsets 220, 230, and 240.

The third forward speed ratio is established with the engagement of the torque-transmitting mechanisms 250, 252, 254, and 258. During the third forward speed ratio, the planet carrier assembly members 246 and 226 are rotated at a speed determined by the speed of the ring gear member 244 and the ring gear/sun gear tooth ratio of the planetary gearset 240. The ring gear member 224 and therefore output shaft 19 are rotated at a speed determined by the speed of the sun gear member 222, the speed of the planet carrier assembly member 226, and the ring gear/sun gear tooth ratio of the planetary gearset 220. The numerical value of the third forward speed ratio is determined by the ring gear/sun gear tooth ratios of the planetary gearsets 220 and 240.

The fourth forward speed ratio is established with the engagement of the torque-transmitting mechanisms 252, 254, 256, and 258. This combination of engagements selectively connects the planet carrier assembly member 246 with the output shaft 19. During the fourth forward speed ratio, the planet carrier assembly member 246 and therefore output shaft 19 are rotated at a speed determined by the speed of the ring gear member 244 and the ring gear/sun gear tooth ratio of the planetary gearset 240. The numerical value of the fourth forward speed ratio is determined by the ring gear/sun gear tooth ratio of the planetary gearset 240.

The fifth forward speed ratio is established with the engagement of the torque-transmitting mechanisms 250, 252, 254, and 256. During the fifth forward speed ratio, the planetary gearset 220 and therefore output shaft 19 are rotated in unison with the input shaft 17. The numerical value of the fifth forward speed ratio is one.

The sixth forward speed ratio is established with the engagement of the torque-transmitting mechanisms 252, 254, 256, and 260. During the sixth forward speed ratio, the ring gear member 234, the planetary gearset 220, and the output shaft 19 are rotated at a speed determined by the speed of the planet carrier assembly member 236 and the ring gear/sun gear tooth ratio of the planetary gearset 230. The numerical value of the sixth forward speed ratio is determined by the ring gear/sun gear tooth ratio of the planetary gearset 230.

The seventh forward speed ratio is established with the engagement of the torque-transmitting mechanisms 250, 252, 256, and 260. During the seventh forward speed ratio, the ring gear member 234 and planet carrier assembly member 226 are rotated at a speed determined by the speed of the planet carrier assembly member 236 and the ring gear/sun gear tooth ratio of the planetary gearset 230. The ring gear member 224 and therefore output shaft 19 are rotated at a speed determined by the speed of the sun gear member 222, the speed of the planet carrier assembly member 226, and the ring gear/sun gear tooth ratio of the planetary gearset 220. The numerical value of the seventh forward speed ratio is determined by the ring gear/sun gear tooth ratios of the planetary gearsets 220 and 230.

As with the previously described family members, the single step forward interchanges are all of the single transition variety, and the reverse-to-first interchange can also be of the single transition variety.

Figures 7, 8:
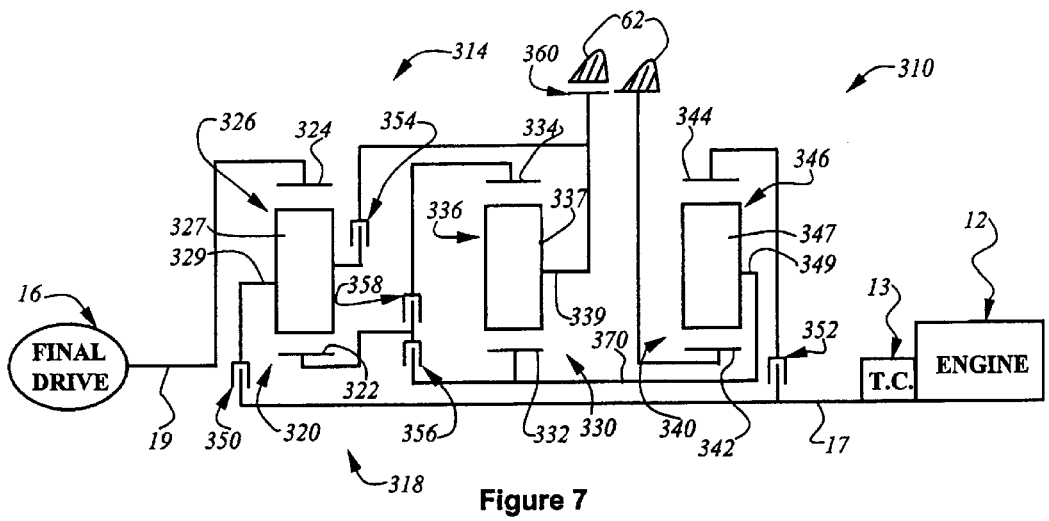
FIG. 7 is a schematic presentation of a powertrain incorporating another embodiment of the present invention.
FIG. 8 is a truth table and chart representing some of the operating parameters of the embodiment shown in FIG. 7.

A powertrain 310, shown in FIG. 7, includes the engine 12, the starting device 13, a planetary transmission 314, and the final drive mechanism 16. The planetary transmission 314 includes the input shaft 17, a planetary gear arrangement 318, and the output shaft 19.

The planetary gear arrangement 318 includes three planetary gearsets 320, 330 and 340 and six torque-transmitting mechanisms 350, 352, 354, 356, 358, and 360. The torque-transmitting mechanism 360 is a stationary type torque-transmitting mechanism while the remaining torque-transmitting mechanisms are of the rotating type torque-transmitting mechanisms.

The planetary gearset 320 includes a sun gear member 322, a ring gear member 324, and a planet carrier assembly member 326. The planet carrier assembly member 326 includes a plurality of pinion gears 327 rotatably mounted on a planet carrier member 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier member 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier member 349 and disposed in meshing relationship with both the sun gear member 342 and the ring gear member 344.

The sun gear member 332 and planet carrier assembly member 346 are continuously interconnected by an interconnecting member 370. The sun gear member 342 is continuously connected with the transmission housing 62. The output shaft 19 is continuously connected with the ring gear member 324.

The input shaft 17 is selectively connectible with the planet carrier assembly member 326 through the torque-transmitting mechanism 350, and selectively connectible with the ring gear member 344 through the torque-transmitting mechanism 352. The interconnecting member 370 is selectively connectible with the sun gear member 322 through the torque-transmitting mechanism 356. The planet carrier assembly member 336 is selectively connectible with the planet carrier assembly member 326 through the torque-transmitting mechanism 354, and selectively connectible with the transmission housing 62 through the torque-transmitting mechanism 360. The sun gear member 322 and ring gear member 334 are selectively interconnectible through the torque-transmitting mechanism 358.

The truth table of FIG. 8 describes the engagement sequence and combinations of engagement for the torque-transmitting mechanisms in order to establish a reverse speed ratio and seven forward speed ratios through the planetary gear arrangement 318 between the input shaft 17 and the output shaft 19. Also provided in the truth table is an example of the numerical values that are available with the planetary gear arrangement 318 when the ring gear/sun gear tooth ratios R1/S1, R2/S2, and R3/S3, which represent the ring gear/sun gear tooth ratios of the planetary gearsets 320, 330, and 340, respectively, are utilized. Also given in FIG. 8 is a chart of the numerical values for the ratio steps between adjacent forward speed ratios as well as between the reverse and first forward speed ratio. The numerical value for the overall ratio spread of the forward speed ratios is also provided in the chart of FIG. 8.

The reverse speed ratio is established with the engagement of the torque-transmitting mechanisms 352, 354, 356, and 360. During the reverse speed ratio, the planet carrier assembly member 346, sun gear member 332, and sun gear member 322 are rotated at a speed determined by the speed of the ring gear member 344 and the ring gear/sun gear tooth ratio of the planetary gearset 340. The ring gear member 324 and therefore output shaft 19 are rotated at a speed determined by the speed of the sun gear member 322 and the ring gear/sun gear tooth ratio of the planetary gearset 320. The numerical value for the reverse speed ratio is determined by the ring gear/sun gear tooth ratios of the planetary gearsets 320 and 340.

The first forward speed ratio is established with the engagement of the torque-transmitting mechanisms 352, 354, 358, and 360. During the first forward speed ratio, the speed of the planet carrier assembly member 346 and sun gear member 332 are determined by the speed of ring gear member 344 and the ring gear/sun gear tooth ratio of the planetary gearset 340. The speed of the ring gear member 334 and sun gear member 322 are determined by the speed of the sun gear member 332 and the ring gear/sun gear tooth ratio of the planetary gearset 330. The speed of the ring gear member 324 and therefore output shaft 19 are determined by the speed of the sun gear member 322 and the ring gear/sun gear tooth ratio of the planetary gearset 320. The numerical value for the first forward speed ratio is determined by the ring gear/sun gear tooth ratios of all three planetary gearsets 320, 330, and 340.

The second forward speed ratio is established with the engagement of the torque-transmitting mechanisms 352, 354, 356, and 358. During the second forward speed ratio, the ring gear member 324 and therefore output shaft 19 are selectively connected with the planet carrier assembly member 346. During the second forward speed ratio is the planet carrier assembly member 346 and therefore output shaft 19 are rotated at a speed determined by the speed of the ring gear member 344 and the ring gear/sun gear tooth ratio of the planetary gearset 340. The numerical value of the second forward speed ratio is determined by the ring gear/sun gear tooth ratio of the planetary gearset 340.

The third forward speed ratio is established with the engagement of the torque-transmitting mechanisms 350, 352, 354, and 358. During the third forward speed ratio, the planet carrier assembly member 346 and sun gear member 332 are rotated at a speed determined by the speed of the ring gear member 344 and the ring gear/sun gear tooth ratio of the planetary gearset 340. The ring gear member 334 and sun gear member 322 are rotated at a speed determined by the speed of the sun gear member 332, the speed of the planet carrier assembly member 336, and the ring gear/sun gear tooth ratio of the planetary gearset 330. The ring gear member 324 and therefore output shaft 19 are rotated at a speed determined by the speed of the sun gear member 322, the speed of the planet carrier assembly member 326, and the ring gear/sun gear tooth ratio of the planetary gearset 320. The numerical value of the third forward speed ratio is determined by the ring gear/sun gear tooth ratios of all three planetary gearsets 320, 330, and 340.

The fourth forward speed ratio is established with the engagement of the torque-transmitting mechanisms 350, 354, 356, and 358. During the fourth forward speed ratio, the planetary gearset 320 and output shaft 19 rotate in unison with the input shaft 17. The numerical value of the fourth forward speed ratio is one.

The fifth forward speed ratio is established with the engagement of the torque-transmitting mechanisms 350, 352, 356, and 358. During the fifth forward speed ratio, the planet carrier assembly member 346, sun gear member 332, and sun gear member 322 are rotated at a speed determined by the speed of the ring gear member 344 and the ring gear/sun gear tooth ratio of the planetary gearset 340. The ring gear member 324 and therefore output shaft 19 are rotated at a speed determined by the speed of the sun gear member 322, the speed of the planet carrier assembly member 326, and the ring gear/sun gear tooth ratio of the planetary gearset 320. The numerical value of the fifth forward speed ratio is determined by the ring gear/sun gear tooth ratios of the planetary gearsets 320 and 340.

The sixth forward speed ratio is established with the engagement of the torque-transmitting mechanisms 350, 356, 358, and 360. During the sixth forward speed ratio, the ring gear member 324 and therefore output shaft 19 are rotated at a speed determined by the speed of the planet carrier assembly member 326 and the ring gear/sun gear tooth ratio of the planetary gearset 320. The numerical value of the sixth forward speed ratio is determined by the ring gear/sun gear tooth ratio of the planetary gearset 320.

The seventh forward speed ratio is established with the engagement of the torque-transmitting mechanisms 350, 352, 358, and 360. During the seventh forward speed ratio, the planet carrier assembly member 346 and sun gear member 332 are rotated at a speed determined by the speed of the ring gear member 344 and the ring gear/sun gear tooth ratio planetary gearset 340. The ring gear member 334 and sun gear member 322 are rotated at a speed determined by the speed of the sun gear member 332 and the ring gear/sun gear tooth ratio of the planetary gearset 330. The ring gear member 324 and therefore output shaft 19 are rotated at a speed determined by the speed of the sun gear member 322, the speed of the planet carrier assembly member 326, and the ring gear/sun gear tooth ratio of the planetary gearset 320. The numerical value of the seventh forward speed ratio is determined by the ring gear/sun gear tooth ratios of all three planetary gearsets 320, 330, and 340.

As with the preceding family members, each of the single step forward interchanges is of the single transition variety. The reverse-to-first forward speed ratio can also be of the single transition variety.

Figures 9, 10:
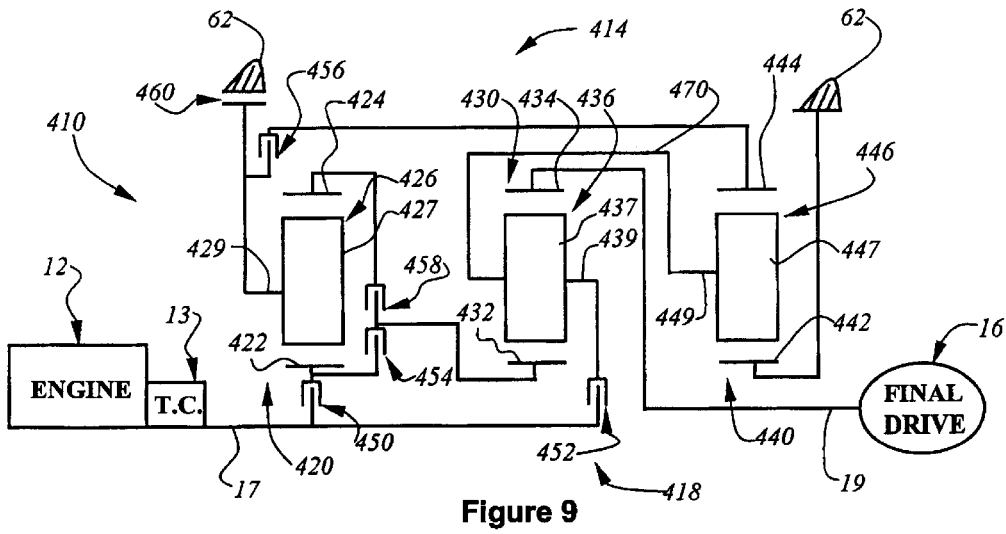
FIG. 9 is a schematic presentation of a powertrain incorporating another embodiment of the present invention.
FIG. 10 is a truth table and chart representing some of the operating parameters of the embodiment shown in FIG. 9.

A powertrain 410, shown in FIG. 9, includes the engine 12, the starting device 13, a planetary transmission 414, and the final drive mechanism 16. The planetary transmission 414 includes the input shaft 17, a planetary gear arrangement 418, and the output shaft 19.

The planetary gear arrangement 418 includes three planetary gearsets 420, 430 and 440 and six torque-transmitting mechanisms 450, 452, 454, 456, 458, and 460. The torque-transmitting mechanism 460 is a stationary type torque-transmitting mechanism while the remaining torque-transmitting mechanisms are of the rotating type torque-transmitting mechanisms.

The planetary gearset 420 includes a sun gear member 422, a ring gear member 424, and a planet carrier assembly member 426. The planet carrier assembly member 426 includes a plurality of pinion gears 427 rotatably mounted on a planet carrier member 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on a planet carrier member 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier member 449 and disposed in meshing relationship with both the sun gear member 442 and the ring gear member 444.

The planet carrier assembly member 436 and planet carrier assembly member 446 are continuously interconnected by an interconnecting member 470. The sun gear member 442 is continuously interconnected with the transmission housing 62. The output shaft 19 is continuously interconnected with the ring gear member 434.

The input shaft 17 is selectively connectible with the sun gear member 422 through the torque-transmitting mechanism 450, and with the interconnecting member 470 through the torque-transmitting mechanism 452. The sun gear member 432 is selectively interconnectible with the sun gear member 422 through the torque-transmitting mechanism 454, and selectively connectible with the ring gear member 424 through the torque-transmitting mechanism 458. The planet carrier assembly member 426 is selectively connectible with the ring gear member 444 through the torque-transmitting mechanism 456, and selectively interconnectible with the transmission housing 62 through the torque-transmitting mechanism 460.

The truth table shown in FIG. 10 describes the engagement sequence and combinations of engagement for the torque-transmitting mechanisms in order to establish seven forward speed ratios and one reverse speed ratio through the planetary gear arrangement 418 between the input shaft 17 and the output shaft 19. The truth table also provides a numerical example for the forward speed ratios and the reverse speed ratio that might be obtained in the planetary gear arrangement 418 when the ring gear/sun gear tooth ratios of the planetary gearsets 420, 430, and 440 are as given in FIG. 10 as R1/S1, R2/S2, and R3/S3, respectively. A chart of FIG. 10 gives the numerical values for the ratio steps between adjacent forward speed ratios as well as between the reverse and first forward speed ratio. The numerical value for the overall forward ratio spread is also given in the chart of FIG. 10.

The reverse speed ratio is established with the engagement of the torque-transmitting mechanisms 450, 454, 456, and 460. During the reverse speed ratio, the ring gear member 434 and therefore output shaft 19 are rotated at a speed determined by the speed of the sun gear member 432 and the ring gear/sun gear tooth ratio of the planetary gearset 430. The numerical value of the reverse speed ratio is determined by the ring gear/sun gear tooth ratio of the planetary gearset 430.

The first forward speed ratio is established with the engagement of the torque-transmitting mechanisms 450, 456, 458, and 460. During the first forward speed ratio, the ring gear member 424 and sun gear member 432 are rotated at a speed determined by the speed of the sun gear member 422 and the ring gear/sun gear tooth ratio of the planetary gearset 420. The ring gear member 434 and therefore output shaft 19 are rotated at a speed determined by the speed of the sun gear member 432 and the ring gear/sun gear tooth ratio of the planetary gearset 430. The numerical value of the first forward speed ratio is determined by the ring gear/sun gear tooth ratios of the planetary gearsets 420 and 430.

The second forward speed ratio is established with the engagement of the torque-transmitting mechanisms 450, 452, 456, and 458. During the second forward speed ratio, the planet carrier assembly member 446 and planet carrier assembly member 436 are rotated at a speed determined by the speed of the ring gear member 444 and the ring gear/sun gear tooth ratio of the planetary gearset 440. The ring gear member 434 and therefore output shaft 19 are rotated at a speed determined by the speed of the sun gear member 432, the speed of the planet carrier assembly member 436, and the ring gear/sun gear tooth ratio of the planetary gearset 430. The numerical value of the second forward speed ratio is determined by the ring gear/sun gear tooth ratios of the planetary gearsets 430 and 440.

The third forward speed ratio is established with the engagement of the torque-transmitting mechanisms 450, 452, 456, and 458. During the third forward speed ratio, the ring gear member 444 and planet carrier assembly member 426 are rotated at a speed determined by the speed of the planet carrier assembly member 446 and the ring gear/sun gear tooth ratio of the planetary gearset 440. The ring gear member 424 and sun gear member 432 are rotated at a speed determined by the speed of the sun gear member 422 and the ring gear/sun gear tooth ratio of the planetary gearset 420. The ring gear member 434 and therefore output shaft 19 are rotated at a speed determined by the speed of the planet carrier assembly member 436, the speed of the sun gear member 432, and the ring gear/sun gear tooth ratio of the planetary gearset 430. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 452, 454, 456, and 458. During the fourth forward speed ratio, the ring gear member 444, the planetary gearset 420, and sun gear member 432 are rotated at a speed determined by the speed of the planet carrier assembly member 446 and the ring gear/sun gear tooth ratio of the planetary gearset 440. The ring gear member 434 and therefore output shaft 19 are rotated at a speed determined by the speed of the planet carrier assembly member 436, the speed of the sun gear member 432, and the ring gear/sun gear tooth ratio of the planetary gearset 430. The numerical value of the fourth forward speed ratio is determined by the ring gear/sun gear tooth ratios of the planetary gearsets 430 and 440.

The fifth forward speed ratio is established with the engagement of the torque-transmitting mechanisms 450, 452, 454, and 458. During the fifth forward speed ratio, the planetary gearset 430 and therefore output shaft 19 rotate in unison with the input shaft 17. The numerical value of the fifth forward speed ratio is one.

The sixth forward speed ratio is established with the engagement of the torque-transmitting mechanisms 452, 454, 458, and 460. During the sixth forward speed ratio, the ring gear member 434 and therefore output shaft 19 are rotated at a speed determined by the speed of the planet carrier assembly member 436 and the ring gear/sun gear tooth ratio of the planetary gearset 430. The numerical value of the sixth forward speed ratio is determined by the ring gear/sun gear tooth ratio of the planetary gearset 430.

The seventh forward speed ratio is established with the engagement of the torque-transmitting mechanisms 450, 452, 458, and 460. During the seventh forward speed ratio, the ring gear member 424 and sun gear member 432 are rotated at a speed determined by the speed of the sun gear member 422 and the ring gear/sun gear tooth ratio of the planetary gearset 420. The ring gear member 434 and therefore output shaft 19 are rotated at a speed determined by the speed of the sun gear member 432, the speed of the planet carrier assembly member 436, and the ring gear/sun gear tooth ratio of the planetary gearset 430. The numerical value of the seventh forward speed ratio is determined by the ring gear/sun gear tooth ratios of the planetary gearsets 420 and 430.

As with the preceding family members, each of the single step forward interchanges is of the single transition variety. The reverse-to-first forward speed ratio can also be of the single transition variety.

Figures 11, 12:
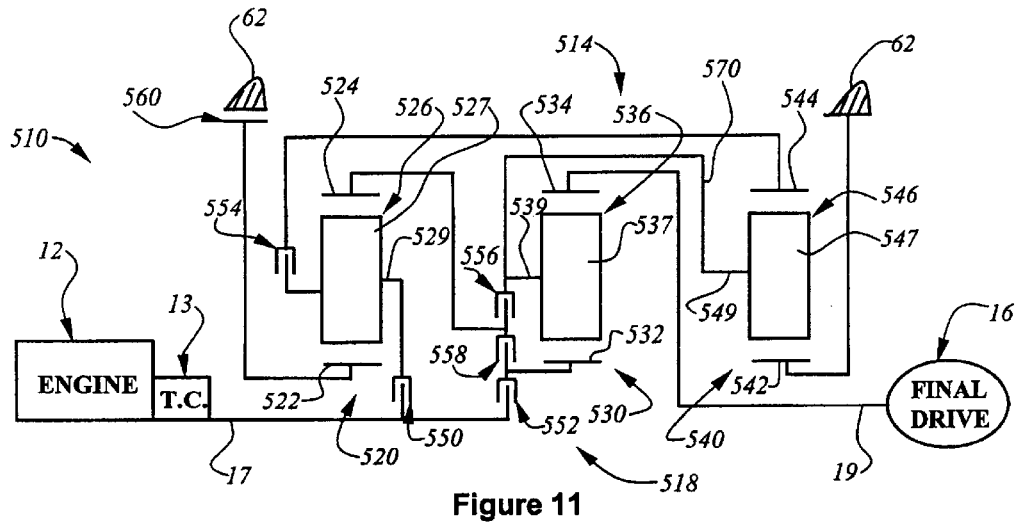
FIG. 11 is a schematic presentation of a powertrain incorporating another embodiment of the present invention.
FIG. 12 is a truth table and chart representing some of the operating parameters of the embodiment shown in FIG. 11.

A powertrain 510, shown in FIG. 11, includes the engine 12, the starting device 13, a planetary transmission 514, and the final drive mechanism 16. The planetary transmission 514 includes the input shaft 17, a planetary gear arrangement 518, and the output shaft 19.

The planetary gear arrangement 518 includes three planetary gearsets 520, 530 and 540 and six torque-transmitting mechanisms 550, 552, 554, 556, 558, and 560. The torque-transmitting mechanism 560 is a stationary type torque-transmitting mechanism while the remaining torque-transmitting mechanisms are of the rotating type torque-transmitting mechanisms.

The planetary gearset 520 includes a sun gear member 522, a ring gear member 524, and a planet carrier assembly member 526. The planet carrier assembly member 526 includes a plurality of pinion gears 527 rotatably mounted on a planet carrier member 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on a planet carrier member 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier member 549 and disposed in meshing relationship with both the sun gear member 542 and the ring gear member 544.

The planet carrier assembly member 536 and planet carrier assembly member 546 are continuously interconnected by an interconnecting member 570. The sun gear member 542 is continuously connected with the transmission housing 62. The ring gear member 534 is continuously connected with the output shaft 19.

The input shaft 17 is selectively connectible with the planet carrier assembly member 526 through the torque-transmitting mechanism 550, and selectively connectible with the sun gear member 532 through the torque-transmitting mechanism 552. The sun gear member 522 is selectively connectible with the transmission housing 62 through the torque-transmitting mechanism 560. The planet carrier assembly member 526 is selectively connectible with the ring gear member 544 through the torque-transmitting mechanism 554. The ring gear member 524 is selectively interconnectible with the interconnecting member 570 through the torque-transmitting mechanism 556, and selectively interconnectible with the sun gear member 532 through the torque-transmitting mechanism 558.

The truth table shown in FIG. 12 provides a description of the engagement sequence and combinations of engagement for the torque-transmitting mechanisms in order to establish seven forward speed ratios and a reverse speed ratio in the planetary gear arrangement 518 between the input shaft 17 and the output shaft 19. A numerical value for each of the speed ratios is also provided in the truth table. The numerical values are determined utilizing the ring gear/sun gear tooth ratios of the planetary gearsets 520, 530, and 540 as represented by R1/S1, R2/S2, and R3/S3, respectively. A chart in FIG. 12 provides the numerical values of the ratio steps between adjacent forward speed ratios as well as between the reverse and first forward speed ratio. This chart also provides the numerical values for the overall ratio spread of the forward speed ratios.

The reverse speed ratio is established with the engagement of the torque-transmitting mechanisms 552, 554, 556, and 560. During the reverse speed ratio, the ring gear member 534 and therefore output shaft 19 are rotated at a speed determined by the speed of the sun gear member 532 and the ring gear/sun gear tooth ratio of the planetary gearset

530. The numerical value of the reverse speed ratio is determined by the ring gear/sun gear tooth ratio of the planetary gearset 530.

The first forward speed ratio is established with the engagement of the torque-transmitting mechanisms 552, 554, 558, and 560. During the first forward speed ratio, the planet carrier assembly member 526 and ring gear member 544 are rotated at a speed determined by the speed of the ring gear member 524 and the ring gear/sun gear tooth ratio of the planetary gearset 520. The planet carrier assembly member 546 and planet carrier assembly member 536 are rotated at a speed determined by the speed of the ring gear member 544 and the ring gear/sun gear tooth ratio of the planetary gearset 540. The ring gear member 534 and therefore output shaft 19 are rotated at a speed determined by the speed of the sun gear member 532, the speed of the planet carrier assembly member 536, and the ring gear/sun gear tooth ratio of the planetary gearset 530. The numerical value of the first forward speed ratio is determined by the ring gear/sun gear tooth ratios of all three planetary gearsets 520, 530, and 540.

The second forward speed ratio is established with the engagement of the torque-transmitting mechanisms 550, 554, 558, and 560. During the second forward speed ratio, the planet carrier assembly members 546 and 536 are rotated at a speed determined by the speed of the ring gear member 544 and the ring gear/sun gear tooth ratio of the planetary gearset 540. The ring gear member 524 and sun gear member 532 are rotated at a speed determined by the speed of the planet carrier assembly member 526 and the ring gear/sun gear tooth ratio of the planetary gearset 520. The ring gear member 534 and therefore output shaft 19 are rotated at a speed determined by the speed of the sun gear member 532, the speed of the planet carrier assembly member 536, and the ring gear/sun gear tooth ratio of the planetary gearset 530. The numerical value of the second forward speed ratio is determined by the ring gear/sun gear tooth ratios of all three planetary gearsets 520, 530, and 540.

The third forward speed ratio is established with the engagement of the torque-transmitting mechanisms 550, 552, 554, and 558. During the third forward speed ratio, the planet carrier assembly members 546 and 536 are rotated at a speed determined by the speed of the ring gear member 544 and the ring gear/sun gear tooth ratio of the planetary gearset 540. The ring gear member 534 and therefore output shaft 19 are rotated at a speed determined by the speed of the sun gear member 532, the speed of the planet carrier assembly member 536, and the ring gear/sun gear tooth ratio of the planetary gearset 530. The numerical value of the third forward speed ratio is determined by the ring gear/sun gear tooth ratios of the planetary gearsets 530 and 540.

The fourth forward speed ratio is established with the engagement of the torque-transmitting mechanisms 550, 554, 556, and 558. During the fourth forward speed ratio, the planetary gearset 530 is rotated in unison with the planet carrier assembly member 546. Also during the fourth forward speed ratio, the planet carrier assembly member 546 and therefore output shaft 19 are rotated at a speed determined by the speed of the ring gear member 544 and the ring gear/sun gear tooth ratio of the planetary gearset 540. The numerical value of the fourth forward speed ratio is determined by the ring gear/sun gear tooth ratio of the planetary gearset 540.

The fifth forward speed ratio is established with the engagement of the torque-transmitting mechanisms 550, 552, 556, and 558. During the fifth forward speed ratio, the planetary gearset 530 and therefore output shaft 19 rotate in unison with the input shaft 17. The numerical value of the fifth forward speed ratio is one.

The sixth forward speed ratio is established with the engagement of the torque-transmitting mechanisms 550, 556, 558 and 560. During the sixth forward speed ratio, the speed of the ring gear member 524, the planetary gearset 530, and output shaft 19 are determined by the speed of the planet carrier assembly member 526 and the ring gear/sun gear tooth ratio of the planetary gearset 520. The numerical value of the sixth forward speed ratio is determined by the ring gear/sun gear tooth ratio of the planetary gearset 520.

The seventh forward speed ratio is established with the engagement of the torque-transmitting mechanisms 550, 552, 556, and 560. During the seventh forward speed ratio, the ring gear member 524 and planet carrier assembly member 536 are rotated at a speed determined by the speed of the planet carrier assembly member 526 and the ring gear/sun gear tooth ratio of the planetary gearset 520. The ring gear member 534 and therefore output shaft 19 are rotated at a speed determined by the speed of the sun gear member 532, the speed of the planet carrier assembly member 536, and the ring gear/sun gear tooth ratio of the planetary gearset 530. The numerical value of the seventh forward speed ratio is determined by the ring gear/sun gear tooth ratios of the planetary gearsets 520 and 530.

As with the previously described family members, each of the forward single step interchanges are of the single transition variety.

Figures 13, 14:
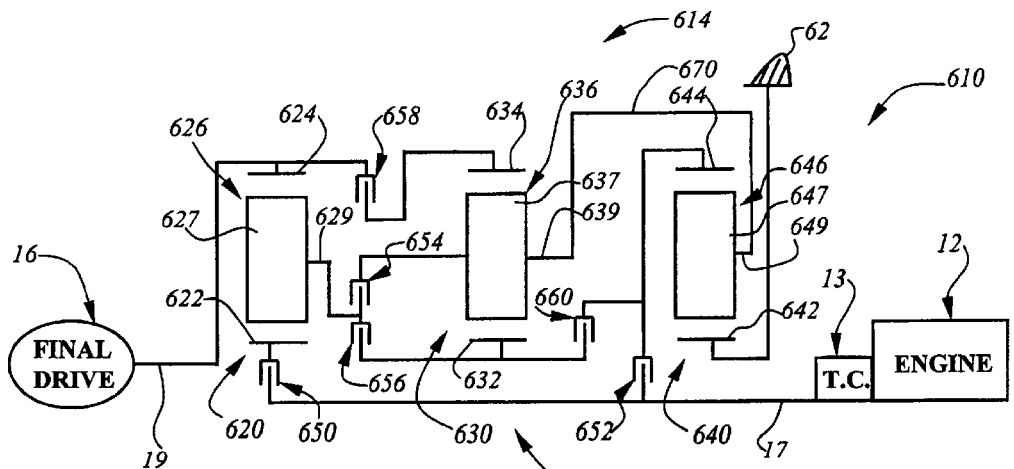
FIG. 13 is a schematic presentation of a powertrain incorporating another embodiment of the present invention.
FIG. 14 is a truth table and chart representing some of the operating parameters of the embodiment shown in FIG. 13.

A powertrain 610, shown in FIG. 13, includes the engine 12, the starting device 13, a planetary transmission 614, and the final drive mechanism 16. The planetary transmission 614 includes the input shaft 17, a planetary gear arrangement 618, and the output shaft 19.

The planetary gear arrangement 618 includes three planetary gearsets 620, 630 and 640 and six torque-transmitting mechanisms 650, 652, 654, 656, 658, and 660. All of the torque-transmitting mechanisms are of the rotating type torque-transmitting mechanisms.

The planetary gearset 620 includes a sun gear member 622, a ring gear member 624, and a planet carrier assembly member 626. The planet carrier assembly member 626 includes a plurality of pinion gears 627 rotatably mounted on a planet carrier member 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on a planet carrier member 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier member 649 and disposed in meshing relationship with both the sun gear member 642 and the ring gear member 644.

The planet carrier assembly members 636 and 646 are continuously interconnected by an interconnecting member 670. The sun gear member 642 is continuously connected with the transmission housing 62. The ring gear member 624 is continuously connected with the output shaft 19.

The input shaft 17 is selectively connectible with the sun gear member 622 through the torque-transmitting mechanism 650, and selectively connectible with the ring gear member 644 through the torque-transmitting mechanism 652. The planet carrier assembly member 626 is selectively connectible with the interconnecting member 670 through the torque-transmitting mechanism 654, and selectively connectible with the sun gear member 632 through the torque-transmitting mechanism 656. The ring gear member 634 is selectively connectible with the output shaft 19 through the torque-transmitting mechanism 658. The sun gear member 632 is selectively interconnectible with the ring gear member 644 through the torque-transmitting mechanism 660.

The truth table of FIG. 14 describes the engagement sequence and combinations of engagement for the torque-transmitting mechanisms in order to establish seven forward speed ratios and one reverse speed ratio between the input shaft 17 and the output shaft 19 through the planetary gear arrangement 618. Also given in FIG. 14 is a numerical example of speed ratios that are available with the planetary gear arrangement 618. These numerical values are determined by the ring gear/sun gear tooth ratios of the planetary gearsets 620, 630, and 640 when these values are equal to the ratios R1/S1, R2/S2, and R3/S3, respectively. A chart in FIG. 14 gives a numerical example for the ratio steps between adjacent forward speed ratios as well as between the reverse and first forward speed ratio. Further information given in the chart of FIG. 14 is the numerical value for the overall ratio spread of the forward speed ratios.

The reverse speed ratio is established with the engagement of the torque-transmitting mechanisms 650, 654, 656, and 660. During the reverse speed ratio, the ring gear member 624 and therefore output shaft 19 are rotated at a speed determined by the speed of the sun gear member 622 and the ring gear/sun gear tooth ratio of the planetary gearset 620. The numerical value of the ring gear/sun gear tooth ratio is determined by the ring gear/sun gear tooth ratio of the planetary gearset 620.

The first forward speed ratio is established with the engagement of the torque-transmitting mechanisms 650, 656, 568, and 660. During the first forward speed ratio, the planet carrier assembly member 626, sun gear member 632, and ring gear member 644 are rotated at a speed determined by the speed of the sun gear member 622, the speed of the ring gear member 624, and the ring gear/sun gear tooth ratio of the planetary gearset 620. The planet carrier assembly member 646 and planet carrier assembly member 636 are rotated at a speed determined by the speed of the ring gear member 644 and the ring gear/sun gear tooth ratio of the planetary gearset 640. The ring gear member 634, ring gear member 624, and output shaft 19 are rotated at a speed determined by the speed of the sun gear member 632, the speed of the planet carrier assembly member 636, and the ring gear/sun gear tooth ratio of the planetary gearset 630. The numerical value for the first forward speed ratio is determined by the ring gear/sun gear tooth ratios of all three planetary gearsets 620, 630, and 640.

The second forward speed ratio is established with the engagement of the torque-transmitting mechanisms 650, 654, 658, and 660. During the second forward speed ratio, the planet carrier assembly member 626, the planet carrier assembly member 636, and the planet carrier assembly member 646 all rotate at a speed determined by the speed of the input shaft 17 and sun gear member 622, the speed of the ring gear member 624, and the ring gear/sun gear tooth ratio of the planetary gearset 620. The ring gear member 644 and sun gear member 632 rotate at a speed determined by the speed of planet carrier assembly member 646 and the ring gear/sun gear tooth ratio of the planetary gearset 640. The ring gear member 634, ring gear member 624, and output shaft 19 rotate at a speed determined by the speed of the sun gear member 632, the speed of the planet carrier assembly member 636, and the ring gear/sun gear tooth ratio of the planetary gearset 630. The numerical value of the second forward speed ratio is determined by the ring gear/sun gear tooth ratios of all three planetary gearsets 620, 630, and 640.

The third forward speed ratio is established with the engagement of the torque-transmitting mechanisms 652, 654, 658, and 660. During the third forward speed ratio, the planet carrier assembly members 646, 636, and 626 are rotated at a speed determined by the speed of the ring gear member 644 and the ring gear/sun gear tooth ratio of the planetary gearset 640. The ring gear members 634 and 624 and the output shaft 19 are rotated at a speed determined by the speed of the sun gear member 632, the speed of the planet carrier assembly member 636, and the ring gear/sun gear tooth ratio of the planetary gearset 630. The numerical value of the third forward speed ratio is determined by the ring gear/sun gear tooth ratios of the planetary gearsets 630 and 640.

The fourth forward speed ratio is established with the engagement of the torque-transmitting mechanisms 650, 652, 654, and 658. During the fourth forward speed ratio, the planet carrier assembly members 646, 636, and 626 are rotated at a speed determined by the speed of the ring gear member 644 and the ring gear/sun gear tooth ratio of the planetary gearset 640. The ring gear member 624 and therefore output shaft 19 are rotated at a speed determined by the speed of the sun gear member 622, the speed of the planet carrier assembly member 626, and the ring gear/sun gear tooth ratio of the planetary gearset 620. The numerical value of the fourth forward speed ratio is determined by the ring gear/sun gear tooth ratios of the planetary gearsets 620 and 640.

The fifth forward speed ratio is established with the engagement of the torque-transmitting mechanisms 650, 652, 656, and 658. During the fifth forward speed ratio, the speed of the planet carrier assembly member 646 and 636 is determined by the speed of the ring gear member 644 and the ring gear/sun gear tooth ratio of the planetary gearset 640. The speed of the planet carrier assembly member 626 and sun gear member 632 are determined by the speed of the sun gear member 622, the speed of the ring gear member 624, and the ring gear/sun gear tooth ratio of the planetary gearset 620. The speed of the ring gear members 634 and 624 and output shaft 19 are determined by the speed of the sun gear member 632, the speed of the planet carrier assembly member 636, and the ring gear/sun gear tooth ratio of the planetary gearset 630. The numerical value of the fifth forward speed ratio is determined by the ring gear/sun gear tooth ratios of all three planetary gearsets 620, 630, and 640.

The sixth forward speed ratio is established with the engagement of the torque-transmitting mechanisms 652, 654, 656, and 658. During the sixth forward speed ratio, the planet carrier assembly member 646, planetary gearset 630, planetary gearset 620, and output shaft 19 all rotate in unison. The planet carrier assembly member 646 and therefore output shaft 19 are rotated at a speed determined by the speed of the ring gear member 644 and the ring gear/sun gear tooth ratio of the planetary gearset 640. The numerical value of the sixth forward speed ratio is determined by the ring gear/sun gear tooth ratio of the planetary gearset 640.

The seventh forward speed ratio is established with the engagement of the torque-transmitting mechanisms 650, 654, 656, and 658. During the seventh forward speed ratio, the planetary gearset 620 and output shaft 19 rotate in unison with the input shaft 17. The numerical value of the seventh forward speed ratio is one.

As with all of the previously described family members, the single step forward interchanges are each of the single transition variety.

Figures 15, 16:
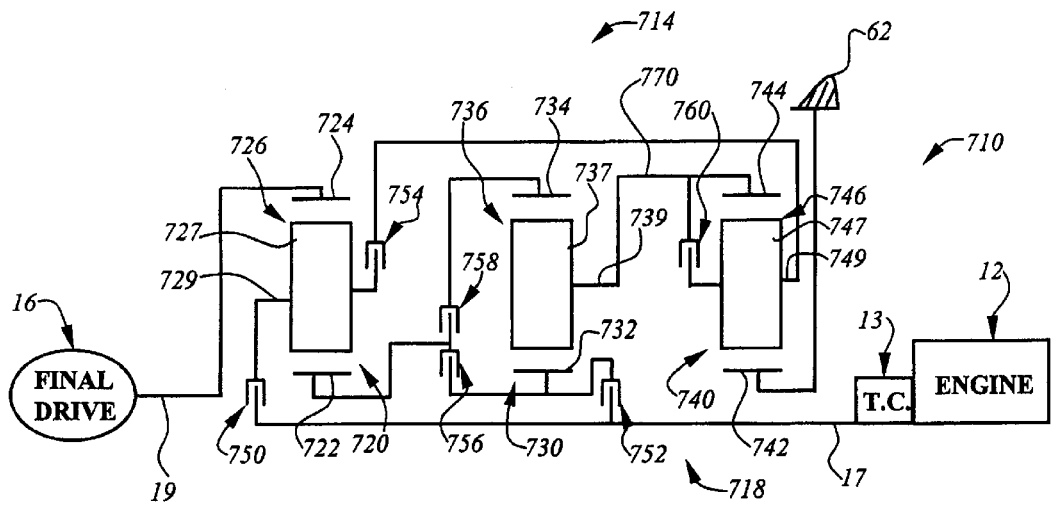
FIG. 15 is a schematic presentation of a powertrain incorporating another embodiment of the present invention.
FIG. 16 is a truth table and chart representing some of the operating parameters of the embodiment shown in FIG. 15.

A powertrain 710, shown in FIG. 15, includes the engine 12, the starting device 13, a planetary transmission 714, and the final drive mechanism 16. The planetary transmission 714 includes the input shaft 17, a planetary gear arrangement 718, and the output shaft 19.

The planetary gear arrangement 718 includes three planetary gearsets 720, 730 and 740 and six rotating type torque-transmitting mechanisms 750, 752, 754, 756, 758, and 760.

The planetary gearset 720 includes a sun gear member 722, a ring gear member 724, and a planet carrier assembly member 726. The planet carrier assembly member 726 includes a plurality of pinion gears 727 rotatably mounted on a planet carrier member 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on a planet carrier member 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier member 749 and disposed in meshing relationship with both the sun gear member 742 and the ring gear member 744.

The planet carrier assembly member 736 and ring gear member 744 are continuously interconnected by an interconnecting member 770. The sun gear member 742 is continuously interconnected with the transmission housing 62. The ring gear member 724 is continuously interconnected with the output shaft 19.

The input shaft 17 is selectively connectible with the planet carrier assembly member 726 through the torque-transmitting mechanism 750, and selectively connectible with the sun gear member 732 through the torque-transmitting mechanism 752. The planet carrier assembly member 746 is selectively connectible with the planet carrier assembly member 726 through the torque-transmitting mechanism 754, and selectively interconnectible with the interconnecting member 770 through the torque-transmitting mechanism 760. The sun gear member 722 is selectively interconnectible with the sun gear member 732 through the torque-transmitting mechanism 756, and selectively connectible with the ring gear member 734 through the torque-transmitting mechanism 758.

As seen in the truth table of FIG. 16, the torque-transmitting mechanisms are engaged in combinations of four to establish seven forward speed ratios and a reverse speed ratio between the input shaft 17 and the output shaft 19 through the planetary gear arrangement 718. The truth table also provides an example of numerical values that can be obtained for the speed ratios with the planetary gear arrangement 718 when the ring gear/sun gear tooth ratios of the planetary gearsets 720, 730, and 740 are as shown in FIG. 16 as R1/S1, R2/S2, and R3/S3, respectively. Further information given in FIG. 16 by way of a chart is the numerical value for the ratio steps between adjacent forward speed ratios as well as between the reverse and first forward speed ratio. This chart also provides the numerical value for the overall ratio spread of the forward speed ratios.

The reverse speed ratio is established with the engagement of the torque-transmitting mechanisms 752, 754, 756, and 760. During the reverse speed ratio, the ring gear member 724 and output shaft 19 are rotated at a speed determined by the speed of the sun gear member 722 and the ring gear/sun gear tooth ratio of the planetary gearset 720. The numerical value of the reverse speed ratio is determined by the ring gear/sun gear tooth ratio of the planetary gearset 720.

The first forward speed ratio is established with the engagement of the torque-transmitting mechanisms 752, 754, 758, and 760. During the first forward speed ratio, the ring gear member 734 and sun gear member 722 are rotated at a speed determined by the speed of the sun gear member 732 and the ring gear/sun gear tooth ratio of the planetary gearset 730. The ring gear member 724 and therefore output shaft 19 are rotated at a speed determined by the speed of the sun gear member 722 and the ring gear/sun gear tooth ratio of the planetary gearset 720. The numerical value of the first forward speed ratio is determined by the ring gear/sun gear tooth ratios of the planetary gearsets 720 and 730.

The second forward speed ratio is established with the engagement of the torque-transmitting mechanisms 752, 754, 756, and 758. During the second forward speed ratio, the ring gear member 744 is rotated in unison with the input shaft 17. The planet carrier assembly member 746 and planet carrier assembly member 726 are rotated at a speed determined by the speed of the ring gear member 744 and the ring gear/sun gear tooth ratio of the planetary gearset 740. The ring gear member 724 and therefore output shaft 19 are rotated at a speed determined by the speed of the sun gear member 722, the speed of the planet carrier assembly member 726, and the ring gear/sun gear tooth ratio of the planetary gearset 720. The numerical value of the second forward speed ratio is determined by the ring gear/sun gear tooth ratios of the planetary gearsets 720 and 740.

The third forward speed ratio is established with the engagement of the torque-transmitting mechanisms 750, 752, 754, and 758. During the third forward speed ratio, the ring gear member 744 and planet carrier assembly member 736 are rotated at a speed determined by the speed of the planet carrier assembly member 746 and the ring gear/sun gear tooth ratio of the planetary gearset 740. The ring gear member 734 and sun gear member 722 are rotated at a speed determined by the speed of the sun gear member 732, the speed of the planet carrier assembly member 736, and the ring gear/sun gear tooth ratio of the planetary gearset 730. The ring gear member 724 and therefore output shaft 19 are rotated at a speed determined by the speed of the planet carrier assembly member 726, the speed of the sun gear member 722, and the ring gear/sun gear tooth ratio of the planetary gearset 720. The numerical value of the third forward speed ratio is determined by the ring gear/sun gear tooth ratios of all three planetary gearsets 720, 730, and 740.

The fourth forward speed ratio is established with the engagement of the torque-transmitting mechanisms 750, 754, 756, and 758. During the fourth forward speed ratio, the ring gear member 744, planetary gearset 730, and sun gear member 722 are rotated at a speed determined by the speed of the planet carrier assembly member 746 and the ring gear/sun gear tooth ratio of the planetary gearset 740. The ring gear member 724 and therefore output shaft 19 are rotated at a speed determined by the speed of the planet carrier assembly member 726, the speed of the sun gear member 722, and the ring gear/sun gear tooth ratio of the planetary gearset 720. The numerical value of the fourth forward speed ratio is determined by the ring gear/sun gear tooth ratios of the planetary gearsets 720 and 740.

The fifth forward speed ratio is established with the engagement of the torque-transmitting mechanisms 750, 752, 756, and 758. During the fifth forward speed ratio, the planetary gearset 720 and output shaft 19 rotate in unison with the input shaft 17. The numerical value of the fifth forward speed ratio is one.

The sixth forward speed ratio is established with the engagement of the torque-transmitting mechanisms 750, 756, 758, and 760. During the sixth forward speed ratio, the ring gear member 724 and output shaft 19 are rotated at a speed determined by the speed of the planet carrier assembly member 726 and the ring gear/sun gear tooth ratio of the planetary gearset 720. The numerical value of the sixth forward speed ratio is determined by the ring gear/sun gear tooth ratio of the planetary gearset 720.

The seventh forward speed ratio is established with the engagement of the torque-transmitting mechanisms 750, 752, 758, and 760. During the seventh forward speed ratio, the ring gear member 734 and sun gear member 722 are rotated at a speed determined by the speed of the sun gear member 732 and the ring gear/sun gear tooth ratio of the planetary gearset 730. The ring gear member 724 and therefore output shaft 19 are rotated at a speed determined by the speed of the planet carrier assembly member 726, the speed of the sun gear member 722, and the ring gear/sun gear tooth ratio of the planetary gearset 720. The numerical value of the seventh forward speed ratio is determined by the ring gear/sun gear tooth ratios of the planetary gearsets 720 and 730.

As with the preceding family members, the single step forward interchanges as well as the reverse-to-first forward interchange are of the single transition variety.

Figures 17, 18:
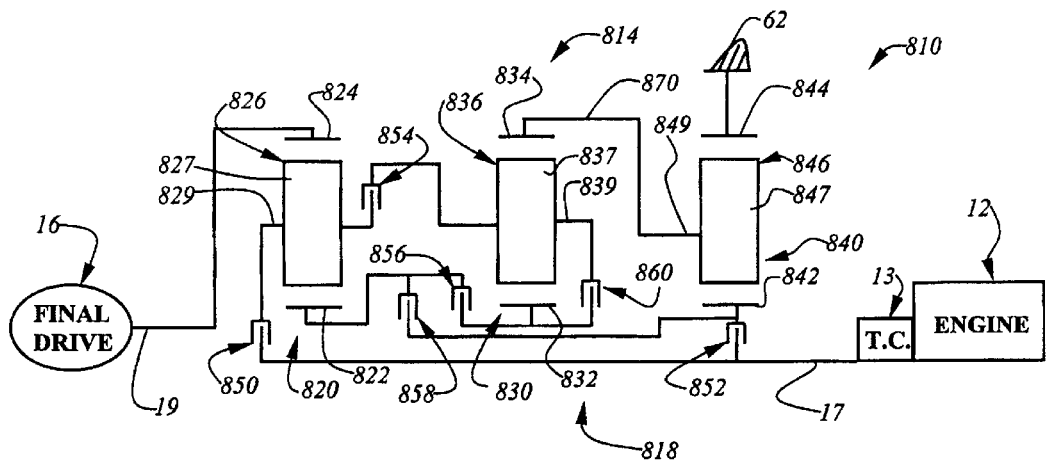
FIG. 17 is a schematic presentation of a powertrain incorporating another embodiment of the present invention.
FIG. 18 is a truth table and chart representing some of the operating parameters of the embodiment shown in FIG. 17.

A powertrain 810, shown in FIG. 17, includes the engine 12, the starting device 13, a planetary transmission 814, and the final drive mechanism 16. The planetary transmission 814 includes the input shaft 17, a planetary gear arrangement 818, and the output shaft 19.

The planetary gear arrangement 818 includes three planetary gearsets 820, 830 and 840 and six rotating type torque-transmitting mechanisms 850, 852, 854, 856, 858, and 860.

The planetary gearset 820 includes a sun gear member 822, a ring gear member 824, and a planet carrier assembly member 826. The planet carrier assembly member 826 includes a plurality of pinion gears 827 rotatably mounted on a planet carrier member 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pinion gears 837 rotatably mounted on a planet carrier member 839 and disposed in meshing relationship with both the sun gear member 832 and the ring gear member 834.

The planetary gearset 840 includes a sun gear member 842, a ring gear member 844, and a planet carrier assembly member 846. The planet carrier assembly member 846 includes a plurality of pinion gears 847 rotatably mounted on a planet carrier member 849 and disposed in meshing relationship with both the sun gear member 842 and the ring gear member 844.

The ring gear member 834 and planet carrier assembly member 846 are continuously interconnected by an interconnecting member 870. The ring gear member 844 is continuously connected with the transmission housing 62. The ring gear member 824 is continuously connected with the output shaft 19.

The input shaft 17 is selectively connectible with the planet carrier assembly member 826 through the torque-transmitting mechanism 850, and selectively connectible with the sun gear member 842 through the torque-transmitting mechanism 852. The sun gear member 822 is selectively connectible with the sun gear member 832 through the torque-transmitting mechanism 856, and selectively connectible with the sun gear member 842 through the torque-transmitting mechanism 858. The planet carrier assembly member 836 is selectively connectible with the planet carrier assembly member 826 through the torque-transmitting mechanism 854, and selectively interconnectible with the sun gear member 832 through the torque-transmitting mechanism 860.

The truth table of FIG. 18 describes the combination of engagements and the engagement sequence of the torque-transmitting mechanisms in order to provide seven forward speed ratios and a reverse speed ratio through the planetary gear arrangement 818 between the input shaft 17 and the output shaft 19. The truth table also provides a numerical example of the speed ratios that are available with the planetary gear arrangement 818 when the ring gear/sun gear tooth ratios of the planetary gearsets 820, 830, and 840 are selected as given in FIG. 18 as R1/S1, R2/S2, and R3/S3, respectively. Also given in FIG. 18 is a chart, which provides the numerical values for the ratio steps between adjacent forward speed ratios as well as between the reverse and first forward speed ratio. The chart also has the numerical value for the overall ratio spread of the forward speed ratios.

The reverse speed ratio is established with the engagement of the torque-transmitting mechanisms 850, 854, 858, and 860. During the reverse speed ratio, the sun gear members 842 and 822 are rotated at a speed determined by the speed of the planet carrier assembly member 846 and the ring gear/sun gear tooth ratio of the planetary gearset 840. The ring gear member 824 and therefore output shaft 19 are rotated at a speed determined by the speed of the planet carrier assembly member 826, the speed of the sun gear member 822, and the ring gear/sun gear tooth ratio of the planetary gearset 820. The numerical value of the reverse speed ratio is determined by the ring gear/sun gear tooth ratios of the planetary gearsets 820 and 840.

The first forward speed ratio is established with the engagement of the torque-transmitting mechanisms 852, 854, 856, and 860. During the first forward speed ratio, the output shaft 19 is effectively connected with the planet carrier assembly member 846. The speed of the planet carrier assembly member 846 and therefore output shaft 19 is determined by the speed of the sun gear member 842 and the ring gear/sun gear tooth ratio of the planetary gearset 840. The numerical value of the first forward speed ratio is determined by the ring gear/sun gear tooth ratio of the planetary gearset 840.

The second forward speed ratio is established with the engagement of the torque-transmitting mechanisms 852, 854, 856, and 858. During the second forward speed ratio, the planet carrier assembly member 846 and ring gear member 834 are rotated at a speed determined by the speed of the sun gear member 842 and the ring gear/sun gear tooth ratio of the planetary gearset 840. The planet carrier assembly members 836 and 826 are rotated at a speed determined by the speed of the ring gear member 834, the speed of the sun gear member 832, and the ring gear/sun gear tooth ratio of the planetary gearset 830. The ring gear member 824 and therefore output shaft 19 are rotated at a speed determined by the speed of the sun gear member 822, the speed of the planet carrier assembly member 826, and the ring gear/sun gear tooth ratio of the planetary gearset 820. The numerical value of the second forward speed ratio is determined by the ring gear/sun gear tooth ratios of all three planetary gearsets 820, 830, and 840.

The third forward speed ratio is established with the engagement of the torque-transmitting mechanisms 850, 852, 854, and 856. During the third forward speed ratio, the planet carrier assembly member 846 and ring gear member 834 are rotated at a speed determined by the speed of the sun gear member 842 and the ring gear/sun gear tooth ratio of the planetary gearset 840. The sun gear members 832 and 822 are rotated at a speed determined by the speed of the ring gear member 834, the speed of the planet carrier assembly member 836, and the ring gear/sun gear tooth ratio of the planetary gearset 830. The ring gear member 824 and output shaft 19 are rotated at a speed determined by the speed of the planet carrier assembly member 826, the speed of the sun gear member 822, and the ring gear/sun gear tooth ratio of the planetary gearset 820. The numerical value of the third forward speed ratio is determined by the ring gear/sun gear tooth ratios of all three planetary gearsets 820, 830, and 840.

The fourth forward speed ratio is established with the engagement of the torque-transmitting mechanisms 850, 854, 856, and 858. During the fourth forward speed ratio, the speed of the ring gear member 834 and planet carrier assembly member 846 are determined by the speed of the planet carrier assembly member 836, the speed of the sun gear member 832, and the ring gear/sun gear tooth ratio of the planetary gearset 830. The sun gear members 842, 822, and 832 are rotated at a speed determined by the speed of the planet carrier assembly member 846 and the ring gear/sun gear tooth ratio of the planetary gearset 840. The ring gear member 824 and therefore output shaft 19 are rotated at a speed determined by the speed of the planet carrier assembly member 826, the speed of the sun gear member 822, and the ring gear/sun gear tooth ratio of the planetary gearset 820. The numerical value of the fourth forward speed ratio is determined by the ring gear/sun gear tooth ratios of all three planetary gearsets 820, 830, and 840.

The fifth forward speed ratio is established with the engagement of the torque-transmitting mechanisms 850, 852, 856, and 858. During the fifth forward speed ratio, the planetary gearset 820 and the output shaft 19 rotate in unison with the input shaft 17. The numerical value of the fifth forward speed ratio is one.

The sixth forward speed ratio is established with the engagement of the torque-transmitting mechanisms 850, 852, 856, and 860. During the sixth forward speed ratio, the planet carrier assembly member 846, planetary gearset 830, and sun gear member 822 rotate at a speed determined by the speed of the sun gear member 842 and the ring gear/sun gear tooth ratio of the planetary gearset 840. The ring gear member 824 and therefore output shaft 19 rotate at a speed determined by the speed of the planet carrier assembly member 826, the speed of the sun gear member 822, and the ring gear/sun gear tooth ratio of the planetary gearset 820. The numerical value of the sixth forward speed ratio is determined by the ring gear/sun gear tooth ratios of the planetary gearsets 820 and 840.

The seventh forward speed ratio is established with the engagement of the torque-transmitting mechanisms 850, 856, 858, and 860. During the seventh forward speed ratio, the ring gear member 824 and therefore output shaft 19 are rotated at a speed determined by the speed of the planet carrier assembly member 826 and the ring gear/sun gear tooth ratio of the planetary gearset 820. The numerical value of the seventh forward speed ratio is determined by the ring gear/sun gear tooth ratio of the planetary gearset 820.

Each of the single step forward interchanges is of the single transition variety, as is the reverse-to-first forward speed interchange.

Figures 19, 20:
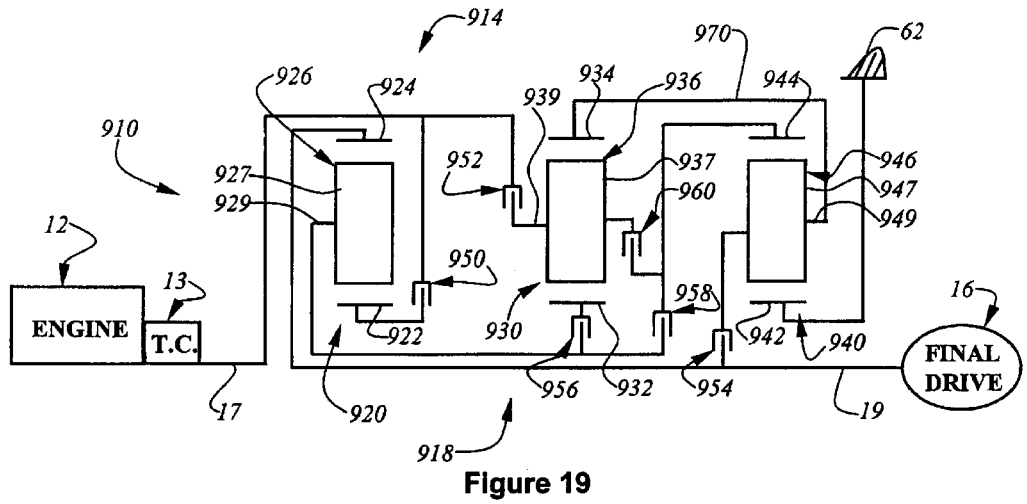
FIG. 19 is a schematic presentation of a powertrain incorporating another embodiment of the present invention.
FIG. 20 is a truth table and chart representing some of the operating parameters of the embodiment shown in FIG. 19.

A powertrain 910, shown in FIG. 19, includes the engine 12, the starting device 13, a planetary transmission 914, and the final drive mechanism 16. The planetary transmission 914 includes the input shaft 17, a planetary gear arrangement 918, and the output shaft 19.

The planetary gear arrangement 918 includes three planetary gearsets 920, 930 and 940 and six rotating type torque-transmitting mechanisms 950, 952, 954, 956, 958, and 960.

The planetary gearset 920 includes a sun gear member 922, a ring gear member 924, and a planet carrier assembly member 926. The planet carrier assembly member 926 includes a plurality of pinion gears 927 rotatably mounted on a planet carrier member 929 and disposed in meshing relationship with both the sun gear member 922 and the ring gear member 924.

The planetary gearset 930 includes a sun gear member 932, a ring gear member 934, and a planet carrier assembly member 936. The planet carrier assembly member 936 includes a plurality of pinion gears 937 rotatably mounted on a planet carrier member 939 and disposed in meshing relationship with both the sun gear member 932 and the ring gear member 934.

The planetary gearset 940 includes a sun gear member 942, a ring gear member 944, and a planet carrier assembly member 946. The planet carrier assembly member 946 includes a plurality of pinion gears 947 rotatably mounted on a planet carrier member 949 and disposed in meshing relationship with both the sun gear member 942 and the ring gear member 944.

The ring gear member 934 and planet carrier assembly member 946 are continuously interconnected by an interconnecting member 970. The sun gear member 942 is continuously connected with the transmission housing 62. The ring gear member 924 is continuously connected with the output shaft 19.

The input shaft 17 is selectively connectible with the sun gear member 922 through the torque-transmitting mechanism 950, and selectively connectible with the planet carrier assembly member 936 through the torque-transmitting mechanism 952. The output shaft 19 and the interconnecting member 970 are selectively interconnectible through the torque-transmitting mechanism 954. The planet carrier assembly member 926 is selectively connectible with the sun gear member 932 through the torque-transmitting mechanism 956, and selectively connectible with the ring gear member 944 through the torque-transmitting mechanism 958. The planet carrier assembly member 936 and ring gear member 944 are selectively connectible through the torque-transmitting mechanism 960.

The truth table shown in FIG. 20 describes the engagement combinations and sequence of engagement for the torque-transmitting mechanisms in order to provide seven forward speed ratios and one reverse speed ratio between the input shaft 17 and output shaft 19 through the planetary gear arrangement 918. The truth table also defines the numerical value for the speed ratios of the planetary gear arrangement 918, which are derived using the ring gear/sun gear tooth ratios of the planetary gearsets 920, 930, and 940 as given in FIG. 20 as R1/S1, R2/S2, and R3/S3, respectively. Given these numerical ratios, the chart in FIG. 20 provides the numerical value for the ratio step between adjacent forward speed ratios as well as between the reverse and first forward speed ratio. Also given in the chart of FIG. 20 is a numerical value for the overall ratio spread of the forward speed ratios.

Those skilled in the art will recognize that the combinations of engagements given in the truth table will provide the numerical values for the speed ratios. The numerical value of the reverse speed ratio is determined by the ring gear/sun gear tooth ratio of the planetary gearset 920. The numerical value of the first forward speed ratio, the sixth forward speed ratio, and the seventh forward speed ratio are determined utilizing the ring gear/sun gear tooth ratios of all three planetary gearsets 920, 930, and 940. The second forward speed ratio has a numerical value determined by the ring gear/sun gear tooth ratios of the planetary gearsets 920 and 940. The third forward speed ratio has a numerical value determined by the ring gear/sun gear tooth ratio of the planetary gearset 940. The fourth forward speed ratio has a numerical value determined by the ring gear/sun gear tooth ratios of the planetary gearsets 930 and 940. The numerical value of the fifth forward speed ratio is one.

A powertrain 1010, shown in FIG. 20, includes the engine 12, the starting device 13, a planetary transmission 1014, and the final drive mechanism 16. The planetary transmission 1014 includes the input shaft 17, a planetary gear arrangement 1018, and the output shaft 19.

The planetary gear arrangement 1018 includes three planetary gearsets 1020, 1030 and 1040 and six rotating type torque-transmitting mechanisms 1050, 1052, 1054, 1056, 1058, and 1060.

The planetary gearset 1020 includes a sun gear member 1022, a ring gear member 1024, and a planet carrier assembly member 1026. The planet carrier assembly member 1026 includes a plurality of pinion gears 1027 rotatably mounted on a planet carrier member 1029 and disposed in meshing relationship with both the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gears 1037 rotatably mounted on a planet carrier member 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of pinion gears 1047 rotatably mounted on a planet carrier member 1049 and disposed in meshing relationship with both the sun gear member 1042 and the ring gear member 1044.

The planet carrier assembly member 1036 is continuously interconnected with the ring gear member 1044 through an interconnecting member 1070. The sun gear member 1042 is continuously connected with the transmission housing 62. The output shaft 19 is continuously connected with the ring gear member 1024.

The input shaft 17 is selectively connectible with the sun gear member 1022 through the torque-transmitting mechanism 1050, and selectively connectible with the interconnecting member 1070 through the torque-transmitting mechanism 1052. The sun gear member 1032 is selectively connectible with the sun gear member 1022 through the torque-transmitting mechanism 1054, and selectively connectible with the planet carrier assembly member 1026 through the torque-transmitting mechanism 1056. The planet carrier assembly member 1046 is selectively connectible with the planet carrier assembly member 1026 through the torque-transmitting mechanism 1058, and selectively connectible with the ring gear member 1034 through the torque-transmitting mechanism 1060.

Figures 21, 22:
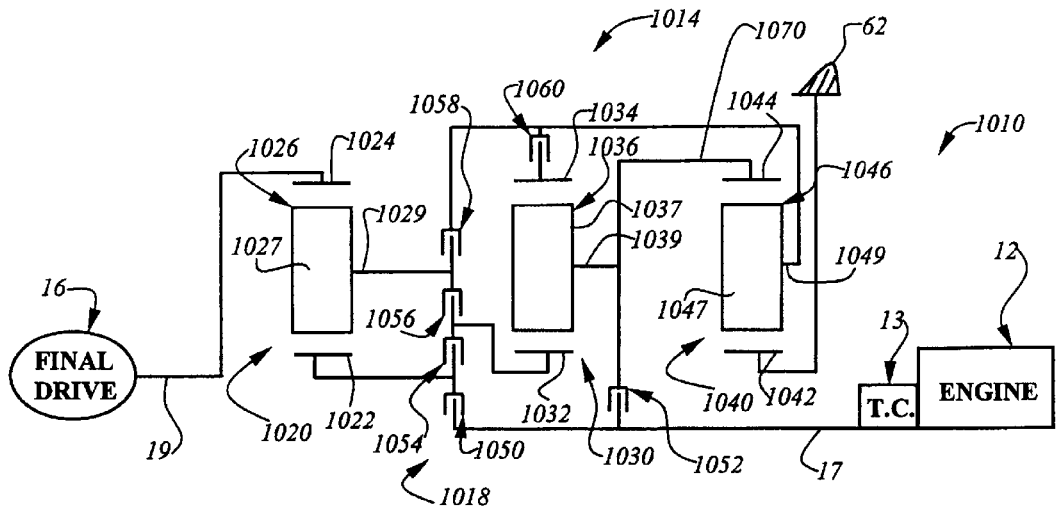
FIG. 21 is a schematic presentation of a powertrain incorporating another embodiment of the present invention.
FIG. 22 is a truth table and chart representing some of the operating parameters of the embodiment shown in FIG. 21.

The truth table shown in FIG. 22 defines the engagement combinations and sequence for the torque-transmitting mechanisms in order to establish seven forward speed ratios and one reverse speed ratio in the planetary gear arrangement 1018 between the input shaft 17 and the output shaft 19. Also given in the truth table is an example of the numerical values for the speed ratios of the planetary gear arrangement 1018 which are derived from the ring gear/sun gear tooth ratios of the planetary gearsets 1020, 1030, and 1040, which are defined in FIG. 22 as R1/S1, R2/S2, and R3/S3, respectively. A chart in FIG. 22 provides the numerical value for the ratio steps between adjacent forward speed ratios as well as between the reverse and first forward speed ratio. Further information provided in the chart of FIG. 22 is the numerical value of the overall ratio spread of forward speed ratios.

Upon reviewing the combinations of engagements for the torque-transmitting mechanisms, those skilled in the art will recognize that the numerical value of the reverse speed ratio is determined by the ring gear/sun gear tooth ratio of the planetary gearset 1020. The numerical value of first forward speed ratio, the second forward speed ratio, and the seventh forward speed ratio are determined by the ring gear/sun gear tooth ratios of all three planetary gearsets 1020, 1030, and 1040. The numerical value of the third forward speed ratio is determined by the ring gear/sun gear tooth ratios of the planetary gearsets 1020 and 1040. The numerical value of the fourth forward speed ratio is determined by the ring gear/sun gear tooth ratio of the planetary gearset 1040. The numerical value of the fifth forward speed ratio is one. The numerical value of the sixth forward speed ratio is determined by the ring gear/sun gear tooth ratios of the planetary gearsets 1030 and 1040.

Figures 23, 24:
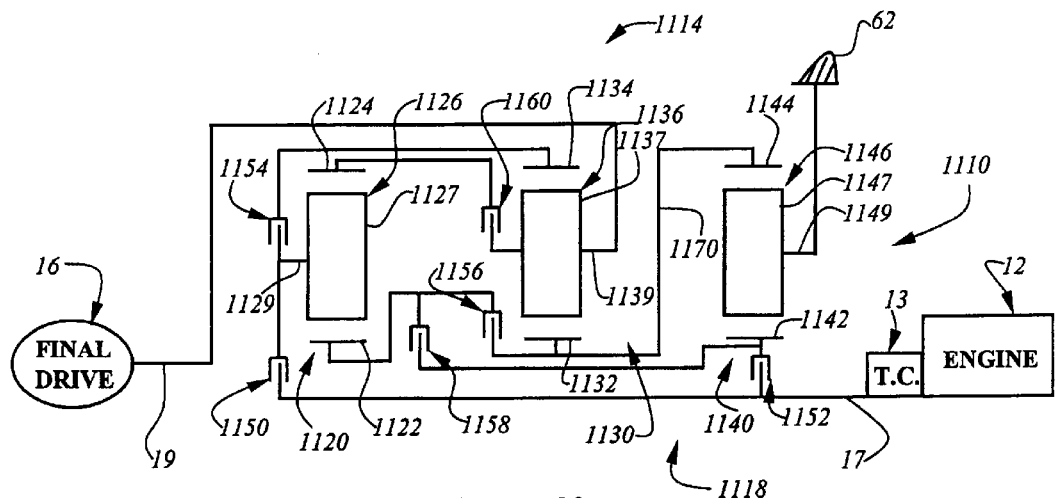
FIG. 23 is a schematic presentation of a powertrain incorporating another embodiment of the present invention.
FIG. 24 is a truth table and chart representing some of the operating parameters of the embodiment shown in FIG. 23.

A powertrain 1110, shown in FIG. 23, includes the engine 12, the starting device 13, a planetary transmission 1114, and the final drive mechanism 16. The planetary transmission 1114 includes the input shaft 17, a planetary gear arrangement 1118, and the output shaft 19.

The planetary gear arrangement 1118 includes three planetary gearsets 1120, 1130 and 1140 and six rotating type torque-transmitting mechanisms 1150, 1152, 1154, 1156, 1158, and 1160.

The planetary gearset 1120 includes a sun gear member 1122, a ring gear member 1124, and a planet carrier assembly member 1126. The planet carrier assembly member 1126 includes a plurality of pinion gears 1127 rotatably mounted on a planet carrier member 1129 and disposed in meshing relationship with both the sun gear member 1122 and the ring gear member 1124.

The planetary gearset 1130 includes a sun gear member 1132, a ring gear member 1134, and a planet carrier assembly member 1136. The planet carrier assembly member 1136 includes a plurality of pinion gears 1137 rotatably mounted on a planet carrier member 1139 and disposed in meshing relationship with both the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of pinion gears 1147 rotatably mounted on a planet carrier member 1149 and disposed in meshing relationship with both the sun gear member 1142 and the ring gear member 1144.

The ring gear member 1132 and ring gear member 1144 are continuously interconnected by an interconnecting member 1170. The planet carrier assembly member 1146 is continuously connected with the transmission housing 62 through the planet carrier member 1149. The output shaft 19 is continuously interconnected with the planet carrier member 1139 of the planet carrier assembly member 1136.

The input shaft 17 is selectively connectible with the planet carrier assembly member 1126 through the torque-transmitting mechanism 1150, and selectively connectible with the sun gear member 1142 through the torque-transmitting mechanism 1152. The planet carrier assembly member 1126 and the ring gear member 1134 are selectively interconnected through the torque transmitting mechanism 1154. The sun gear member 1122 is selectively connectible with the sun gear member 1132 through the torque-transmitting mechanism 1156, and selectively connectible with the sun gear member 1142 through the torque-transmitting mechanism 1158. The ring gear member 1124 is selectively connectible with the planet carrier assembly member 1136 and therefore the output shaft 19 through the torque-transmitting mechanism 1160.

The truth table shown in FIG. 24 defines the engagement combinations and sequence for the torque-transmitting mechanisms in order to establish seven forward speed ratios and one reverse speed ratio between the input shaft 17 and the output shaft 19 through the planetary gear arrangement 1118. A numerical value for each of the forward speed ratios as well as the reverse speed ratio is also given in the truth table of FIG. 24. These numerical values have been determined utilizing the ring gear/sun gear tooth ratios of the planetary gearsets 1120, 1130, and 1140 as defined in FIG. 24 as R1/S1, R2/S2, and R3/S3, respectively. Also given in FIG. 24 in the form of a chart is the numerical value of the ratio steps between adjacent forward speed ratios as well as between the reverse and first forward speed ratio. Further information in FIG. 24 is the numerical value of the overall ratio spread for the forward speed ratios.

Those skilled in the art, upon reviewing the combinations of engagements shown in the truth table, will recognize that the numerical value of the reverse speed ratio is determined by the ring gear/sun gear tooth ratio of the planetary gearset 1140. The numerical value of the first forward speed ratio and the second forward speed ratio are determined by the ring gear/sun gear tooth ratios of all three planetary gearsets 1120, 1130, and 1140. The numerical value of the third forward speed ratio is determined by the ring gear/sun gear tooth ratios of the planetary gearsets 1130 and 1140. The numerical value of the fourth forward speed ratio is determined by the ring gear/sun gear tooth ratio of the planetary gearset 1130. The numerical value of the fifth forward speed ratio is one. The numerical value of the sixth forward speed ratio is determined by the ring gear/sun gear tooth ratio of the planetary gearset 1120. The numerical value of the seventh forward speed ratio is determined by the ring gear/sun gear tooth ratios of the planetary gearsets 1120 and 1140.

Figures 25, 26:
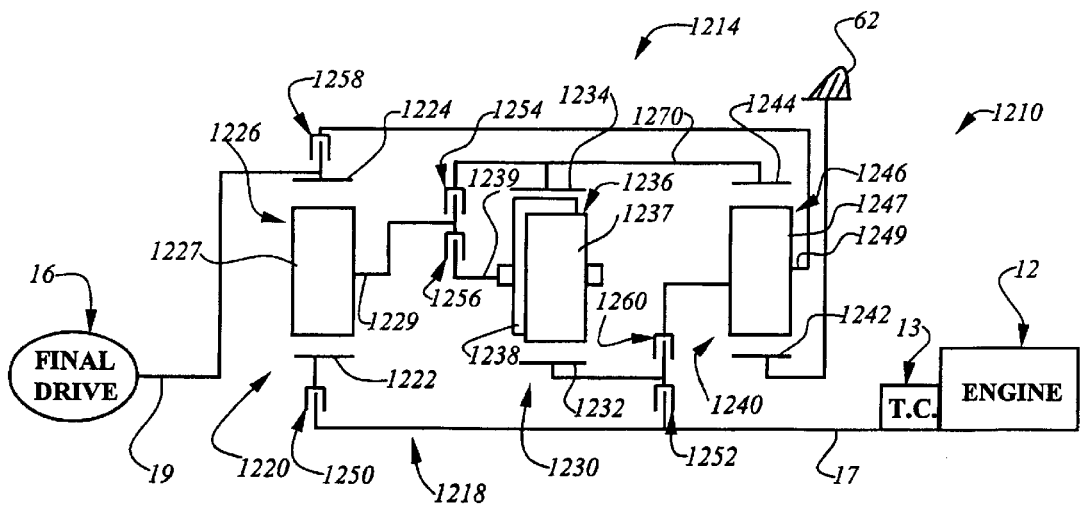
FIG. 25 is a schematic presentation of a powertrain incorporating another embodiment of the present invention.
FIG. 26 is a truth table and chart representing some of the operating parameters of the embodiment shown in FIG. 25.

A powertrain 1210, shown in FIG. 25, includes the engine 12, the starting device 13, a planetary transmission 1214, and the final drive mechanism 16. The planetary transmission 1214 includes the input shaft 17, a planetary gear arrangement 1218, and the output shaft 19.

The planetary gear arrangement 1218 includes three planetary gearsets 1220, 1230 and 1240 and six rotating type torque-transmitting mechanisms 1250, 1252, 1254, 1256, 1258, and 1260.

The planetary gearset 1220 includes a sun gear member 1222, a ring gear member 1224, and a planet carrier assembly member 1226. The planet carrier assembly member 1226 includes a plurality of pinion gears 1227 rotatably mounted on a planet carrier member 1229 and disposed in meshing relationship with both the sun gear member 1222 and the ring gear member 1224.

The planetary gearset 1230 includes a sun gear member 1232, a ring gear member 1234, and a planet carrier assembly member 1236. The planet carrier assembly member 1236 includes pairs of intermeshing pinion gears 1237 and 1238, which are rotatably mounted on a planet carrier member 1239 and mesh with the sun gear member 1232 and the ring gear member 1234, respectively. The planetary gearset 1230 is commonly termed a compound or double pinion planetary gearset wherein a plurality of the pairs of meshing pinions are distributed about the planet carrier member 1239 at the equiangular positions. With a double pinion or compound planetary gearset, when the planet carrier member 1239 is held stationary, the sun gear member and ring gear member will rotate in the same direction.

The planetary gearset 1240 includes a sun gear member 1242, a ring gear member 1244, and a planet carrier assembly member 1246. The planet carrier assembly member 1246 includes a plurality of pinion gears 1247 rotatably mounted on a planet carrier member 1249 and disposed in meshing relationship with both the sun gear member 1242 and the ring gear member 1244.

The ring gear member 1234 and ring gear member 1244 are continuously interconnected by an interconnecting member 1270. The sun gear member 1242 is continuously connected with the transmission housing 62. The ring gear member 1224 is continuously connected with the output shaft 19.

The input shaft 17 is selectively connectible with the sun gear member 1222 through the torque-transmitting mechanism 1250, and selectively connectible with the sun gear member 1232 through the torque-transmitting mechanism 1252. The planet carrier assembly member 1226 is selectively connectible with the interconnecting member 1270 through the torque-transmitting mechanism 1254, and selectively connectible with the planet carrier assembly member 1236 through the torque-transmitting mechanism 1256. The planet carrier assembly member 1246 is selectively connectible with the output shaft 19 through the torque-transmitting mechanism 1258, and selectively connectible with the sun gear member 1232 through the torque-transmitting mechanism 1260.

The six rotating type torque-transmitting mechanisms are selectively engageable in combinations of four as shown in the truth table of FIG. 26. The truth table of FIG. 26 also describes the sequence of engagements for these combinations in order to establish seven forward speed ratios and one reverse speed ratio in the planetary gear arrangement 1218 between the input shaft 17 and the output shaft 19. The truth table provides further information by way of an example of numerical values for the speed ratios of the planetary gear arrangement 1218 when the ring gear/sun gear tooth ratios of the planetary gearsets 1220, 1230, and 1240 are as given in FIG. 26 as R1/S1, R2/S2, and R3/S3, respectively. The chart in FIG. 26 provides a numerical example for the ratio steps between adjacent forward speed ratios as well as between the reverse and first forward speed ratio and the overall ratio spread of the forward speed ratios when the speed ratios given in the truth table of FIG. 26 are employed.

Those skilled in the art will recognize that the combinations of engagements given in the truth table of FIG. 26 will make it readily possible to calculate the speed ratios given in the truth table. The numerical value of the reverse speed ratio is determined by the ring gear/sun gear tooth ratio of the planetary gearset 1220. The numerical value of the first forward speed ratio, the third forward speed ratio, and the seventh forward speed ratio are determined by the ring gear/sun gear tooth ratios of all three planetary gearsets 1220, 1230, and 1240. The numerical value of the second forward speed ratio and the sixth forward speed ratio are determined by the ring gear/sun gear tooth ratios of the planetary gearsets 1220 and 1240. The numerical value of the fourth forward speed ratio is determined by the ring gear/sun gear tooth ratio of the planetary gearset 1240. The numerical value of the fifth forward speed ratio is one.

Figures 27, 28:
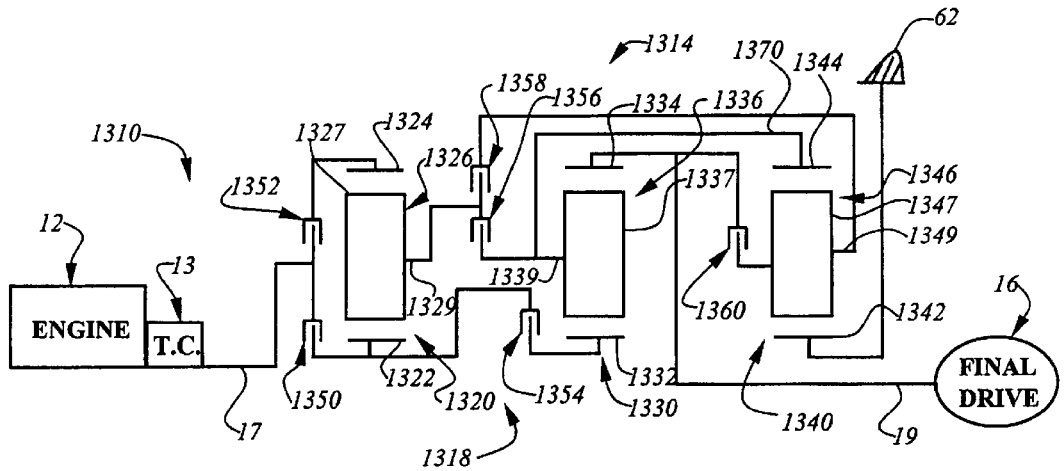
FIG. 27 is a schematic presentation of a powertrain incorporating another embodiment of the present invention.
FIG. 28 is a truth table and chart representing some of the operating parameters of the embodiment shown in FIG. 27.

A powertrain 1310, shown in FIG. 27, includes the engine 12, the starting device 13, a planetary transmission 1314, and the final drive mechanism 16. The planetary transmission 1314 includes the input shaft 17, a planetary gear arrangement 1318, and the output shaft 19.

The planetary gear arrangement 1318 includes three planetary gearsets 1320, 1330 and 1340 and six rotating type torque-transmitting mechanisms 1350, 1352, 1354, 1356, 1358, and 1360.

The planetary gearset 1320 includes a sun gear member 1322, a ring gear member 1324, and a planet carrier assembly member 1326. The planet carrier assembly member 1326 includes a plurality of pinion gears 1327 rotatably mounted on a planet carrier member 1329 and disposed in meshing relationship with both the sun gear member 1322 and the ring gear member 1324.

The planetary gearset 1330 includes a sun gear member 1332, a ring gear member 1334, and a planet carrier assembly member 1336. The planet carrier assembly member 1336 includes a plurality of pinion gears 1337 rotatably mounted on a planet carrier member 1339 and disposed in meshing relationship with both the sun gear member 1332 and the ring gear member 1334.

The planetary gearset 1340 includes a sun gear member 1342, a ring gear member 1344, and a planet carrier assembly member 1346. The planet carrier assembly member 1346 includes a plurality of pinion gears 1347 rotatably mounted on a planet carrier member 1349 and disposed in meshing relationship with both the sun gear member 1342 and the ring gear member 1344.

The planet carrier assembly member 1336 is continuously interconnected with the ring gear member 1344 through an interconnecting member 1370. The sun gear member 1342 is continuously interconnected with the transmission housing 62. The output shaft 19 is continuously interconnected with the ring gear member 1334.

The input shaft 17 is selectively connectible with the sun gear member 1322 through the torque-transmitting mechanism 1350, and selectively connectible with the ring gear member 1324 through the torque-transmitting mechanism 1352. The planet carrier assembly member 1326 is selectively interconnectible with the interconnecting member 1370 through the torque-transmitting mechanism 1356, and selectively connectible with the planet carrier assembly member 1346 through the torque-transmitting mechanism 1358. The sun gear member 1322 is selectively interconnectible with the sun gear member 1332 through the torque-transmitting mechanism 1354. The planet carrier assembly member 1346 is selectively interconnectible with the output shaft 19 through the torque-transmitting mechanism 1360.

The rotating type torque-transmitting mechanisms 1350, 1352, 1354, 1356, 1358, and 1360 are selectively engaged in combinations of four as shown in the truth table of FIG. 28 to establish seven forward speed ratios and one reverse speed ratio in the planetary gear arrangement 1318 between the input shaft 17 and the output shaft 19. An example of numerical values for these speed ratios is also given in the truth table. These numerical examples are determined from the ring gear/sun gear tooth ratios of the planetary gearsets 1320, 1330, and 1340, which are shown in FIG. 28 as R1/S1, R2/S2, and R3/S3, respectively. Also given in FIG. 28 is a numerical value for the ratio steps between adjacent forward speed ratios as well as between the reverse and first forward speed ratio. Also given in FIG. 28 is the numerical value of the overall ratio spread of the forward speed ratios.

Those skilled in the art will recognize that utilizing the combinations of engagements given, the numerical values for the speed ratios can be determined. The numerical value of the reverse speed ratio is determined by the ring gear/sun gear tooth ratio of the planetary gearset 1330. The numerical value of the first forward speed ratio and the sixth forward speed ratio are determined by the ring gear/sun gear tooth ratios of the planetary gearsets 1330 and 1340. The numerical value of the second forward speed ratio is determined by the ring gear/sun gear tooth ratio of the planetary gearset 1340. The numerical of the third forward speed ratio and the seventh forward speed ratio are determined by the ring gear/sun gear tooth ratios of all three planetary gearsets 1320, 1330, and 1340. The numerical value of the fourth forward speed ratio is one. The numerical value of the fifth forward speed ratio is determined by the ring gear/sun gear tooth ratios of the planetary gearsets 1320 and 1330.

Figures 29, 30:
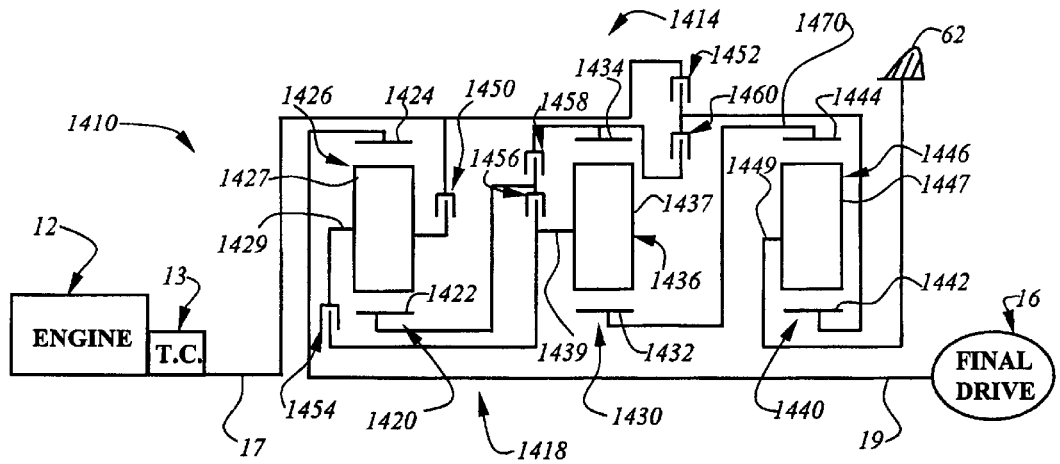
FIG. 29 is a schematic presentation of a powertrain incorporating another embodiment of the present invention.
FIG. 30 is a truth table and chart representing some of the operating parameters of the embodiment shown in FIG. 29.

A powertrain 1410, shown in FIG. 29, includes the engine 12, the starting device 13, a planetary transmission 1414, and the final drive mechanism 16. The planetary transmission 1414 includes the input shaft 17, a planetary gear arrangement 1418, and the output shaft 19.

The planetary gear arrangement 1418 includes three planetary gearsets 1420, 1430 and 1440 and six rotating type torque-transmitting mechanisms 1450, 1452, 1454, 1456, 1458, and 1460.

The planetary gearset 1420 includes a sun gear member 1422, a ring gear member 1424, and a planet carrier assembly member 1426. The planet carrier assembly member 1426 includes a plurality of pinion gears 1427 rotatably mounted on a planet carrier member 1429 and disposed in meshing relationship with both the sun gear member 1422 and the ring gear member 1424.

The planetary gearset 1430 includes a sun gear member 1432, a ring gear member 1434, and a planet carrier assembly member 1436. The planet carrier assembly member 1436 includes a plurality of pinion gears 1437 rotatably mounted on a planet carrier member 1439 and disposed in meshing relationship with both the sun gear member 1432 and the ring gear member 1434.

The planetary gearset 1440 includes a sun gear member 1442, a ring gear member 1444, and a planet carrier assembly member 1446. The planet carrier assembly member 1446 includes a plurality of pinion gears 1447 rotatably mounted on a planet carrier member 1449 and disposed in meshing relationship with both the sun gear member 1442 and the ring gear member 1444.

The sun gear member 1432 and ring gear member 1444 are continuously interconnected by an interconnecting member 1470. The sun gear member 1442 is continuously interconnected with the transmission housing 62. The output shaft 19 is continuously interconnected with the ring gear member 1424.

The input shaft 17 is selectively connectible with the planet carrier assembly member 1426 through the torque-transmitting mechanism 1450, and with the sun gear member 1442 through the torque-transmitting mechanism 1452. The sun gear member 1422 is selectively interconnectible with the planet carrier assembly member 1436 through the torque-transmitting mechanism 1456, and selectively connectible with the ring gear member 1434 through the torque-transmitting mechanism 1458. The planet carrier assembly member 1426 is selectively interconnectible with the planet carrier assembly member 1436 through the torque-transmitting mechanism 1454. The ring gear member 1434 and the sun gear member 1442 are selectively interconnectible by the torque-transmitting mechanism 1460.

The torque-transmitting mechanisms are selectively engaged in combinations of four as shown in the truth table of FIG. 30. The truth table also provides the sequence of these engagement combinations in order to establish seven forward speed ratios and a reverse speed ratio in the planetary arrangement 1418 between the input shaft 17 and the output shaft 19. The truth table of FIG. 30 also provides a numerical example for possible speed ratios of the planetary gear arrangement 1418. The numerical examples of the speed ratios are established utilizing the ring gear/sun gear tooth ratios of the planetary gearsets 1420, 1430, and 1440, which are given in FIG. 30 as the values R1/S1, R2/S2, and R3/S3, respectively. Also given in FIG. 30 is a chart providing the numerical value for the ratio steps between adjacent forward speed ratios as well as between the reverse and first forward speed ratio and the overall ratio spread for the forward speed ratios when the example speed ratios of the truth table are employed.

Those skilled in the art will recognize, upon reviewing the truth table, that the numerical value of the reverse speed ratio is determined by the ring gear/sun gear tooth ratio of the planetary gearset 1440. The numerical value for the first forward speed ratio, the second forward speed ratio, the third forward speed ratio, and the fifth forward speed ratio are determined utilizing the ring gear/sun gear tooth ratios of all three planetary gearsets 1420, 1430, and 1440. The numerical value of the fourth forward speed ratio is one. The numerical value of the sixth forward speed ratio is determined by the ring gear/sun gear tooth ratio of the planetary gearset 1420. The numerical value of the seventh forward speed ratio is determined by the ring gear/sun gear tooth ratios of the planetary gearsets 1420 and 1440.

Figure 31:
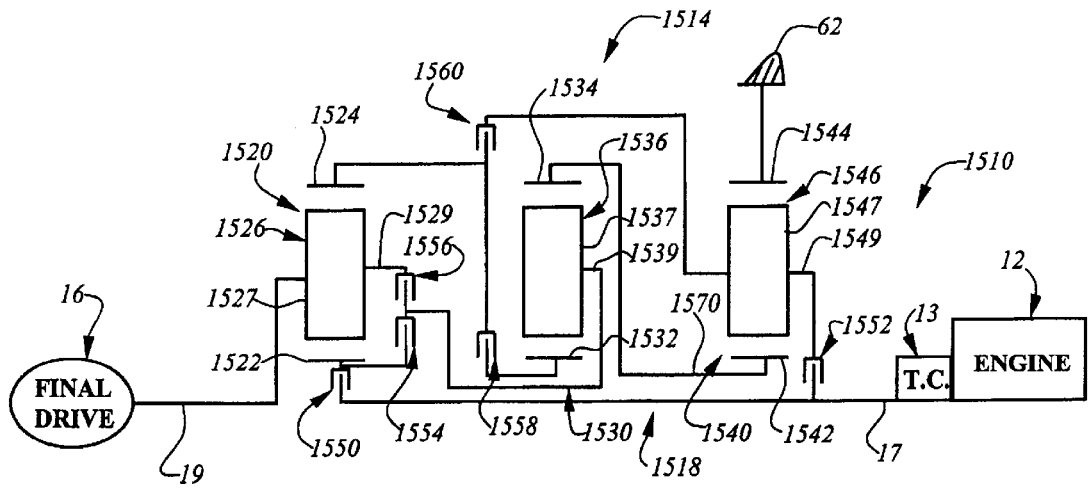
FIG. 31 is a schematic presentation of a powertrain incorporating another embodiment of the present invention.

A powertrain 1510, shown in FIG. 31, includes the engine 12, the starting device 13, a planetary transmission 1514, and the final drive mechanism 16. The planetary transmission 1514 includes the input shaft 17, a planetary gear arrangement 1518, and the output shaft 19.

The planetary gear arrangement 1518 includes three planetary gearsets 1520, 1530 and 1540 and six rotating type torque-transmitting mechanisms 1550, 1552, 1554, 1556, 1558, and 1560.

The planetary gearset 1520 includes a sun gear member 1522, a ring gear member 1524, and a planet carrier assembly member 1526. The planet carrier assembly member 1526 includes a plurality of pinion gears 1527 rotatably mounted on a planet carrier member 1529 and disposed in meshing relationship with both the sun gear member 1522 and the ring gear member 1524.

The planetary gearset 1530 includes a sun gear member 1532, a ring gear member 1534, and a planet carrier assembly member 1536. The planet carrier assembly member 1536 includes a plurality of pinion gears 1537 rotatably mounted on a planet carrier member 1539 and disposed in meshing relationship with both the sun gear member 1532 and the ring gear member 1534.

The planetary gearset 1540 includes a sun gear member 1542, a ring gear member 1544, and a planet carrier assembly member 1546. The planet carrier assembly member 1546 includes a plurality of pinion gears 1547 rotatably mounted on a planet carrier member 1549 and disposed in meshing relationship with both the sun gear member 1542 and the ring gear member 1544.

The ring gear member 1534 and sun gear member 1542 are continuously interconnected by an interconnecting member 1570. The ring gear member 1544 is continuously connected with the transmission housing 62. The output shaft 19 is continuously connected with the planet carrier assembly member 1526.

The input shaft 17 is selectively interconnectible with the sun gear member 1522 through the torque-transmitting mechanism 1550, and selectively interconnectible with the planet carrier assembly member 1546 through the torque-transmitting mechanism 1552. The planet carrier assembly member 1536 is selectively interconnectible with the sun gear member 1522 through the torque-transmitting mechanism 1554, and selectively interconnectible with the planet carrier assembly member 1526 and therefore output shaft 19 through the torque-transmitting mechanism 1556. The ring gear member 1524 is selectively interconnectible with the sun gear member 1532 through the torque-transmitting mechanism 1558, and selectively interconnectible with the planet carrier assembly member 1546 through the torque-transmitting mechanism 1560.

The torque-transmitting mechanisms are engaged in combinations of four as shown in the truth table of FIG. 32. The truth table of FIG. 32 also describes the sequence of engagement for these combinations in order to establish seven forward speed ratios and one reverse speed ratio in the planetary gear arrangement 1518 between the input shaft 17 and the output shaft 19. The truth table also provides an example of the numerical values for the speed ratios that can be obtained within the planetary gear arrangement 1518. These numerical values are determined by the ring gear/sun gear tooth ratios of the planetary gearsets 1520, 1530, and 1540, which are given as R1/S1, R2/S2, and R3/S3, respectively. A chart in FIG. 32 provides numerical values for the ratio steps between adjacent forward speed ratios as well as between the reverse and first forward speed ratio. The chart also provides the numerical value of the overall ratio spread for the forward speed ratios.

Upon reviewing the engagement combinations, those skilled in the art will recognize that the numerical value of the reverse speed ratio, the first forward speed ratio, the second forward speed ratio, the fourth forward speed ratio, and the seventh forward speed ratio are determined by the ring gear/sun gear tooth ratios of all three planetary gearsets 1520, 1530, and 1540. The numerical value of the third forward speed ratio is one. The numerical value of the fifth forward speed ratio is determined by the ring gear/sun gear tooth ratios of the planetary gearsets 1530 and 1540. The numerical value of the sixth forward speed ratio is determined by the ring gear/sun gear tooth ratio of the planetary gearset 1540.

Figure 33:
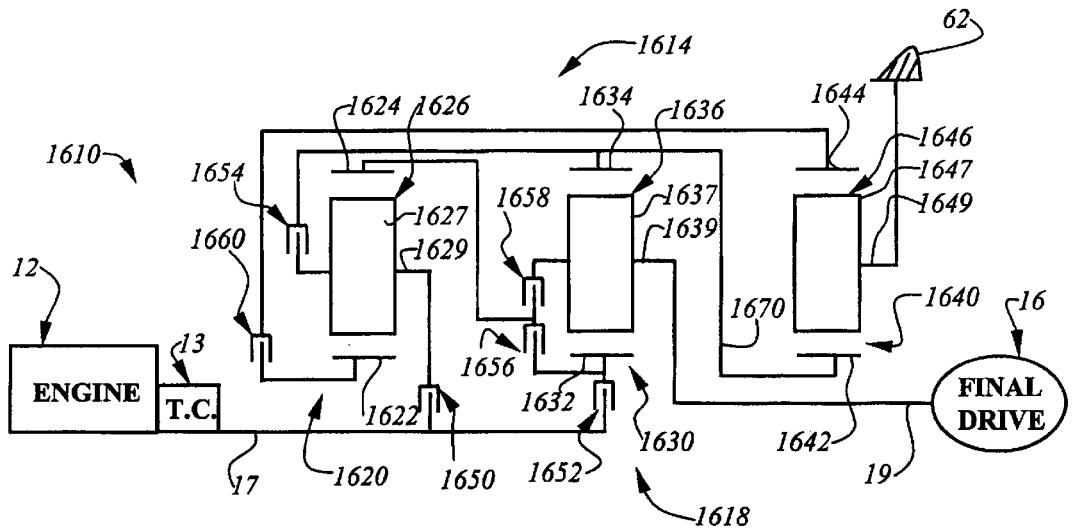
FIG. 33 is a schematic presentation of a powertrain incorporating another embodiment of the present invention.

A powertrain 1610, shown in FIG. 33, includes the engine 12, the starting device 13, a planetary transmission 1614, and the final drive mechanism 16. The planetary transmission 1614 includes the input shaft 17, a planetary gear arrangement 1618, and the output shaft 19.

The planetary gear arrangement 1618 includes three planetary gearsets 1620, 1630 and 1640 and six rotating type torque-transmitting mechanisms 1650, 1652, 1654, 1656, 1658, and 1660.

The planetary gearset 1620 includes a sun gear member 1622, a ring gear member 1624, and a planet carrier assembly member 1626. The planet carrier assembly member 1626 includes a plurality of pinion gears 1627 rotatably mounted on a planet carrier member 1629 and disposed in meshing relationship with both the sun gear member 1622 and the ring gear member 1624.

The planetary gearset 1630 includes a sun gear member 1632, a ring gear member 1634, and a planet carrier assembly member 1636. The planet carrier assembly member 1636 includes a plurality of pinion gears 1637 rotatably mounted on a planet carrier member 1639 and disposed in meshing relationship with both the sun gear member 1632 and the ring gear member 1634.

The planetary gearset 1640 includes a sun gear member 1642, a ring gear member 1644, and a planet carrier assembly member 1646. The planet carrier assembly member 1646 includes a plurality of pinion gears 1647 rotatably mounted on a planet carrier member 1649 and disposed in meshing relationship with both the sun gear member 1642 and the ring gear member 1644.

The ring gear member 1634 and sun gear member 1642 are continuously interconnected by an interconnecting member 1670, which is selectively connectible with the planet carrier assembly member 1636 through the torque-transmitting mechanism 1654. The planet carrier assembly member 1646 is continuously interconnected with the transmission housing 62. The output shaft 19 is continuously connected with the planet carrier assembly member 1636 and selectively connectible with the ring gear member 1624 through the torque-transmitting mechanism 1658.

The input shaft 17 is selectively connectible with the planet carrier assembly member 1626 through the torque-transmitting mechanism 1650, and selectively connectible with the sun gear member 1632 through the torque-transmitting mechanism 1652. The sun gear member 1632 and ring gear member 1624 are selectively interconnectible through the torque-transmitting mechanism 1656. The sun gear member 1622 and the ring gear member 1644 are selectively interconnectible through the torque-transmitting mechanism 1660.

The torque-transmitting mechanisms are selectively engaged in combinations of four as shown in the truth table of FIG. 34. Also shown in FIG. 34 is a numerical example for each of the seven forward speed ratios and the reverse speed ratio. The numerical examples are determined utilizing the ring gear/sun gear tooth ratios of the planetary gearsets 1620, 1630, and 1640, which are given in FIG. 24 as R1/S1, R2/S2, and R3/S3, respectively. A chart in FIG. 34 provides numerical values of the ratio steps between adjacent forward speed ratios as well as between the reverse and first forward speed ratio. This chart also provides the overall ratio spread for the forward speed ratio.

Those skilled in the art, upon reviewing the engagement combinations, will readily determine that the numerical value for the reverse speed ratio is determined by the ring gear/sun gear tooth ratios of the planetary gearsets 1630 and 1640. The numerical value of the first forward speed ratio, the second forward speed ratio, the fourth forward speed ratio, and the seventh forward speed ratio are determined by the ring gear/sun gear tooth ratios of all three planetary gearsets 1620, 1630, and 1640. The numerical value of the third forward speed ratio is one. The numerical value of the fifth forward speed ratio and the sixth forward speed ratio are determined by the ring gear/sun gear tooth ratios of the planetary gearsets 1620 and 1640.

Figure 35:
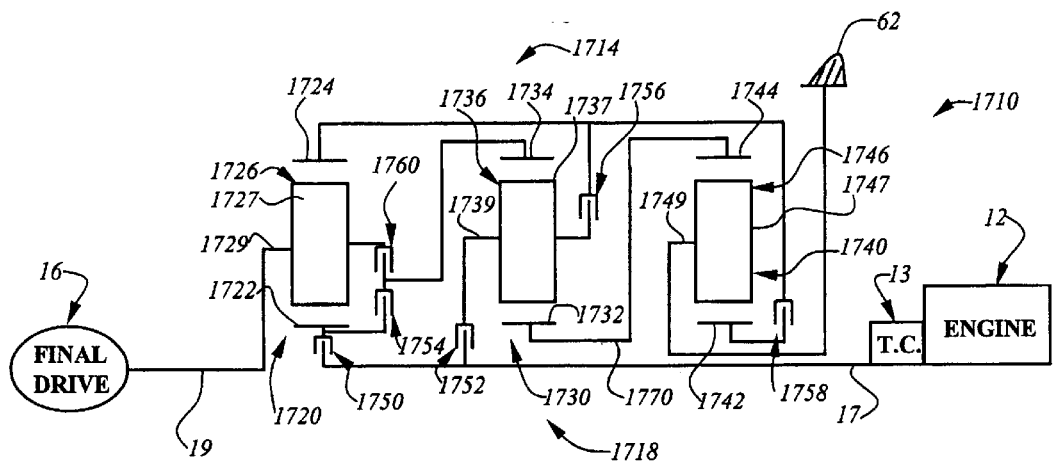
FIG. 35 is a schematic presentation of a powertrain incorporating another embodiment of the present invention.

A powertrain 1710, shown in FIG. 35, includes the engine 12, the starting device 13, a planetary transmission 1714, and the final drive mechanism 16. The planetary transmission 1714 includes the input shaft 17, a planetary gear arrangement 1718, and the output shaft 19.

The planetary gear arrangement 1718 includes three planetary gearsets 1720, 1730 and 1740 and six rotating type torque-transmitting mechanisms 1750, 1752, 1754, 1756, 1758, and 1760.

The planetary gearset 1720 includes a sun gear member 1722, a ring gear member 1724, and a planet carrier assembly member 1726. The planet carrier assembly member 1726 includes a plurality of pinion gears 1727 rotatably mounted on a planet carrier member 1729 and disposed in meshing relationship with both the sun gear member 1722 and the ring gear member 1724.

The planetary gearset 1730 includes a sun gear member 1732, a ring gear member 1734, and a planet carrier assembly member 1736. The planet carrier assembly member 1736 includes a plurality of pinion gears 1737 rotatably mounted on a planet carrier member 1739 and disposed in meshing relationship with both the sun gear member 1732 and the ring gear member 1734.

The planetary gearset 1740 includes a sun gear member 1742, a ring gear member 1744, and a planet carrier assembly member 1746. The planet carrier assembly member 1746 includes a plurality of pinion gears 1747 rotatably mounted on a planet carrier member 1749 and disposed in meshing relationship with both the sun gear member 1742 and the ring gear member 1744.

The sun gear member 1732 and ring gear member 1744 are continuously interconnected by an interconnecting member 1770. The planet carrier assembly member 1746 is continuously interconnected with the transmission housing 62. The output shaft 19 is continuously interconnected with the planet carrier assembly member 1726.

The input shaft 17 is selectively interconnectible with the sun gear member 1722 through the torque-transmitting mechanism 1750, and selectively connectible with the planet carrier assembly member 1736 through the torque-transmitting mechanism 1752. The ring gear member 1734 is selectively interconnectible with the sun gear member 1722 through the torque-transmitting mechanism 1754, and selectively connectible with the planet carrier assembly member 1726 and therefore output shaft 19 through the torque-transmitting mechanism 1760. The ring gear member 1724 is selectively interconnectible with the planet carrier assembly member 1736 through the torque-transmitting mechanism 1756, and selectively connectible with the sun gear member 1742 through the torque-transmitting mechanism 1758.

The torque-transmitting mechanisms are selectively engaged in combinations of four as shown in the truth table of FIG. 36. The truth table also shows the sequence of these engagements in order to establish seven forward speed ratios and one reverse speed ratio in the planetary gear arrangement 1718 through the input shaft 17 and the output shaft 19. The truth table provides a numerical example of speed ratios that are available with the planetary gear arrangement 1718 when the ring gear/sun gear tooth ratios of the planetary gearsets 1720, 1730, and 1740 are given as represented by R1/S1, R2/S2, and R3/S3, respectively. Further information given in FIG. 36 is a chart, which depicts the numerical values of the ratio steps between adjacent forward speed ratios as well as between the reverse and first forward speed ratio. This chart also provides the numerical value for the overall ratio spread of the forward speed ratios.

Those skilled in the art, upon reviewing the engagement combinations, will recognize that the numerical value of the reverse speed ratio is determined by the ring gear/sun gear tooth ratios of the planetary gearsets 1720 and 1740. The numerical value of the first forward speed ratio, the second forward speed ratio, the fourth forward speed ratio, and the seventh forward speed ratio are determined by the ring gear/sun gear tooth ratios of all three planetary gearsets 1720, 1730, and 1740. The numerical value of the third forward speed ratio is one. The numerical value of the fifth forward speed ratio and the sixth forward speed ratio are determined by the ring gear/sun gear tooth ratios of the planetary gearsets 1730 and 1740.

Figures 37, 38:
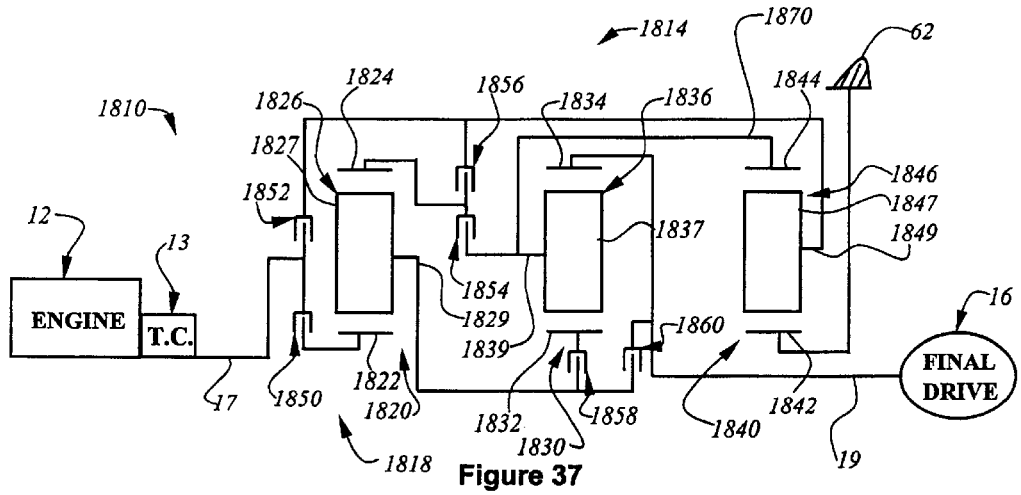
FIG. 37 is a schematic presentation of a powertrain incorporating another embodiment of the present invention.
FIG. 38 is a truth table and chart representing some of the operating parameters of the embodiment shown in FIG. 37.

A powertrain 1810, shown in FIG. 37, includes the engine 12, the starting device 13, a planetary transmission 1814, and the final drive mechanism 16. The planetary transmission 1814 includes the input shaft 17, a planetary gear arrangement 1818, and the output shaft 19.

The planetary gear arrangement 1818 includes three planetary gearsets 1820, 1830 and 1840 and six rotating type torque-transmitting mechanisms 1850, 1852, 1854, 1856, 1858, and 1860.

The planetary gearset 1820 includes a sun gear member 1822, a ring gear member 1824, and a planet carrier assembly member 1826. The planet carrier assembly member 1826 includes a plurality of pinion gears 1827 rotatably mounted on a planet carrier member 1829 and disposed in meshing relationship with both the sun gear member 1822 and the ring gear member 1824.

The planetary gearset 1830 includes a sun gear member 1832, a ring gear member 1834, and a planet carrier assembly member 1836. The planet carrier assembly member 1836 includes a plurality of pinion gears 1837 rotatably mounted on a planet carrier member 1839 and disposed in meshing relationship with both the sun gear member 1832 and the ring gear member 1834.

The planetary gearset 1840 includes a sun gear member 1842, a ring gear member 1844, and a planet carrier assembly member 1846. The planet carrier assembly member 1846 includes a plurality of pinion gears 1847 rotatably mounted on a planet carrier member 1849 and disposed in meshing relationship with both the sun gear member 1842 and the ring gear member 1844.

The planet carrier assembly member 1836 and ring gear member 1844 are continuously interconnected by an interconnecting member 1870, which is selectively connectible with the ring gear member 1824 through the torque-transmitting mechanism 1854. The sun gear member 1842 is continuously connected with the transmission housing 62. The output shaft 19 is continuously interconnected with the ring gear member 1834, and selectively interconnectible with the planet carrier assembly member 1826 through the torque-transmitting mechanism 1860.

The input shaft 17 is selectively interconnectible with the sun gear member 1820 through the torque-transmitting mechanism 1850, and selectively connectible with the planet carrier assembly member 1846 through the torque-transmitting mechanism 1852. The ring gear member 1824 is selectively interconnectible with the planet carrier assembly member 1846 through the torque-transmitting mechanism 1856. The planet carrier assembly member 1826 is selectively interconnectible with the sun gear member 1832 through the torque-transmitting mechanism 1858.

The torque-transmitting mechanisms are selectively engaged in combinations of four as shown in the truth table of FIG. 38 in order to establish seven forward speed ratios and one reverse speed ratio through the planetary gear arrangement 1818 between the input shaft 17 and the output shaft 19. The truth table of FIG. 38 also provides an example of numerical values for speed ratios that are obtainable with the planetary gear arrangement 1818 when the ring gear/sun gear tooth ratios of the planetary gearsets 1820, 1830, and 1840 are as given in FIG. 38 as R1/S1, R2/S2, and R3/S3, respectively. Also given in FIG. 38 is a chart of numerical values for the ratio steps between adjacent forward speed ratios as well as between the reverse and first forward speed ratio. Also present in the chart is the overall ratio spread of the forward speed ratios. These numerical values are, of course, determined utilizing the example ratio values given in the truth table of FIG. 38.

Upon reviewing the engagement combinations given in the truth table, those skilled in the art will recognize that the numerical value of the reverse speed ratio is determined by the ring gear/sun gear tooth ratios of the planetary gearsets 1820 and 1830. The numerical value of the first forward speed ratio is determined by the ring gear/sun gear tooth ratio of the planetary gearset 1820. The numerical value of the second forward speed ratio and the fourth forward speed ratio are determined by the ring gear/sun gear tooth ratios of the planetary gearsets 1820 and 1840. The numerical value of the third forward speed ratio is one. The numerical value of the fifth forward speed ratio is determined by the ring gear/sun gear tooth ratio of the planetary gearset 1840. The numerical value of the sixth forward speed ratio is determined by the ring gear/sun gear tooth ratios of all three planetary gearsets 1820, 1830, and 1840. The numerical value of the seventh forward speed ratio is determined by the ring gear/sun gear tooth ratios of the planetary gearsets 1830 and 1840.

It will now be evident to those skilled in the art that the transmission family members are all defined as having three planetary gearsets and six torque-transmitting mechanisms. Also, these family members are defined as each planetary gearset having three planetary members. The one member of the second planetary gearset and one member of the third planetary gearset are continuously interconnected. One member of the third planetary gearset is continuously connected with the transmission housing. At least one member of the planetary gearsets is continuously interconnected with the output shaft. The input shaft is selectively connectible with various transmission members through at least two of the torque-transmitting mechanisms. Each of the first planetary gearset and the second planetary gearset have at least two members that are not continuously interconnected with any of the other planetary members. These normally non-interconnected members are selectively interconnected with other planetary members or with other transmission members through the selectively engageable torque-transmitting mechanisms.

It should also be apparent that modifications and variations are possible to the family that are not depicted in the above-described embodiments. Therefore, the invention should only be limited by the appended claims.

What is claimed is:

1. A transmission comprising:

an input shaft;

an output shaft;

a transmission housing;

a first planetary gearset having first, second, and third members; a second planetary gearset having first, second, and third members;

a third planetary gearset having first, second, and third members;

a first member of the second planetary gearset and a first member of the third planetary gearset being continuously interconnected by an interconnecting member;

a second member of the third planetary gearset being continuously interconnected with the transmission housing;

said output shaft being continuously interconnected with at least one member of one of the planetary gearsets;

said input shaft being only selectively connectible to respective members of the planetary gearsets through selectively engageable torque transmission mechanisms, six selectively engageable torque-transmitting mechanisms selectively connecting members of said planetary gearsets with said input shaft, said transmission housing, or other members of the planetary gearsets;

said six torque transmitting mechanisms, being selectively connectible in combinations of four to establish at least seven forward speed ratios and one reverse speed ratio in the planetary gearsets; and at least two of said torque-transmitting mechanisms being selectively engageable between said input shaft and respective members of the planetary gearsets.

2. A transmission comprising:

an input shaft;

an output shaft;

a transmission housing;

a first planetary gearset having first, second, and third members;

a second planetary gearset having first, second, and third members;

a third planetary gearset having first, second, and third members;

an interconnecting member continuously interconnecting a first member of said second planetary gearset with a first member of said third planetary gearset;

a second member of the third planetary gearset being continuously interconnected with the transmission housing;

said output shaft being continuously interconnected with at least one member of one of the planetary gearsets; and;

six torque transmitting mechanisms being selectively engaged in combinations of four to establish at least seven forward speed ratios and one reverse speed ratio wherein the first torque-transmitting mechanism selectively interconnecting said input shaft with said second member of said first planetary gearset, the second torque-transmitting mechanism selectively interconnecting said input shaft with said third member of said third planetary gearset, said third torque-transmitting mechanism selectively interconnecting said second member of said first planetary gearset with said second member of said second planetary gearset, said fourth torque-transmitting mechanism selectively interconnecting said interconnecting member with said third member of said first planetary gearset, said fifth torque-transmitting mechanism selectively interconnecting said third member of said first planetary gearset with said third member of said second planetary gearset, and said sixth torque-transmitting mechanism selectively interconnecting said transmission housing, or said first torque-transmitting mechanism selectively interconnecting said input shaft with said second member of said first planetary gearset, said second torque-transmitting mechanism selectively interconnecting said input shaft with said second member of said second planetary gearset, said third torque-transmitting mechanism selectively interconnecting said second member of said first planetary gearset with said third member of said third planetary gearset, said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said second planetary gearset, and said sixth torque-transmitting mechanism selectively interconnecting said interconnecting member with said transmission housing, or said first torque-transmitting mechanism selectively interconnecting said input shaft with said second member of said first planetary gearset, said second torque-transmitting mechanism selectively interconnecting said input shaft with said interconnecting member, said third torque-transmitting mechanism selectively interconnecting said second member of said first planetary gearset with said second member of said second planetary gearset, said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said third planetary gearset, and said sixth torque-transmitting mechanism selectively interconnecting said third member of said second planetary gearset with said transmission housing, or said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said 21- with said second member of said second planetary gearset, said fourth torque-transmitting mechanism selectively interconnecting said third member of said first planetary gearset with said interconnecting member, said fifth torque-transmitting mechanism selectively interconnecting said third member of said first planetary gearset with said third member of said second planetary gearset, and said sixth torque-transmitting mechanism selectively interconnecting said second member of said second planetary gearset with said transmission housing, or said first torque-transmitting mechanism selectively interconnecting said input shaft with said first member of said first planetary gearset, said second torque-transmitting mechanism selectively interconnecting said input shaft with said interconnecting member, said third torque-transmitting mechanism selectively interconnecting said first member of said first planetary gearset with said third member of said second planetary gearset, said fourth torque-transmitting mechanism selectively interconnecting said second member of said first planetary gearset with said third member of said third planetary gearset, said fifth torque-transmitting mechanism selectively interconnecting said third member of said first planetary gearset with said third member of said second planetary gearset, and said sixth torque-transmitting mechanism selectively interconnecting said second member of said first planetary gearset with said transmission housing, or said first torque-transmitting mechanism selectively interconnecting said input shaft with said first member of said first planetary gearset, said second torque-transmitting mechanism selectively interconnecting said input shaft with said third member of said second planetary gearset, said third torque-transmitting mechanism selectively interconnecting said first member of said first planetary gearset with said third member of said third planetary gearset, said fourth torque-transmitting mechanism selectively interconnecting said second member of said first planetary gearset with said interconnecting member, said fifth torque-transmitting mechanism selectively interconnecting said second member of said first planetary gearset with said third member of said second planetary gearset, and said sixth torque-transmitting mechanism selectively interconnecting said third member of said first planetary gearset with said transmission housing, or said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said third member of said first planetary gearset with said interconnecting member, said fifth torque-transmitting mechanism selectively interconnecting said third member of said second planetary gearset with said output shaft, said sixth torque-transmitting mechanism selectively interconnecting said third member of said second planetary gearset with said third member of said third planetary gearset, or said first torque-transmitting mechanism selectively interconnecting said input shaft with said second member of said first planetary gearset, said second torque-transmitting mechanism selectively interconnecting said input shaft with said second member of said second planetary gearset, said third torque-transmitting mechanism selectively interconnecting said second member of said first planetary gearset with said third member of said third planetary gearset, said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said second planetary gearset, and said sixth torque-transmitting mechanism selectively interconnecting said third member of said third planetary gearset with said interconnecting member, or said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said second member of said first planetary gearset with second member of said second planetary gearset, said fourth torque-transmitting mechanism selectively interconnecting said third member of said first planetary gearset with third member of said second planetary gearset, said fifth torque-transmitting mechanism selectively interconnecting said third member of said first planetary gearset with third member of said third planetary gearset, and said sixth torque-transmitting mechanism selectively interconnecting said third member of said second planetary gearset with said second member of said second planetary gearset, or said first torque-transmitting mechanism selectively interconnecting said input shaft with said second member of said first planetary gearset, said second torque-transmitting mechanism selectively interconnecting said input shaft with said second member of said second planetary gearset, said third torque-transmitting mechanism selectively interconnecting said interconnecting member with said output shaft, said fourth torque-transmitting mechanism selectively interconnecting said third member of said first planetary gearset with said third member of said second planetary gearset, said fifth torque-transmitting mechanism selectively interconnecting said third member of said first planetary gearset with said third member of said third planetary gearset, and said sixth torque-transmitting mechanism selectively interconnecting said second member of said second planetary gearset with said third member of said third planetary gearset, or said first torque-transmitting mechanism selectively interconnecting said input shaft with said second member of said first planetary gearset, said second torque-transmitting mechanism selectively interconnecting said input shaft with said interconnecting member, said third torque-transmitting mechanism selectively interconnecting said second member of said first planetary gearset with said second member of said second planetary gearset, said fourth torque-transmitting mechanism selectively interconnecting said third member of said first planetary gearset with third member of said second planetary gearset, said fifth torque-transmitting mechanism selectively interconnecting said third member of said first planetary gearset with third member of said third planetary gearset, and said sixth torque-transmitting mechanism selectively interconnecting said third member of said second planetary gearset with said third member of said third planetary gearset, or said first torque-transmitting mechanism selectively interconnecting said input shaft with said first member of said first planetary gearset, said second torque-transmitting mechanism selectively interconnecting said input shaft with said third member of said second planetary gearset, said third torque-transmitting mechanism selectively interconnecting said first member of said first planetary gearset with third member of said second planetary gearset, said fourth torque-transmitting mechanism selectively interconnecting said second member of said first planetary gearset with said interconnecting member, said fifth torque-transmitting mechanism selectively interconnecting said second member of said first planetary gearset with said third member of said third planetary gearset, and said sixth torque-transmitting mechanism selectively interconnecting said third member of said first planetary gearset with said output shaft, or first torque-transmitting mechanism selectively interconnecting said input shaft with said second member of said first planetary gearset, said second torque-transmitting mechanism selectively interconnecting said input shaft with said second member of said second planetary gearset, said third torque-transmitting mechanism selectively interconnecting said third member of said first planetary gearset with said interconnecting member, said fourth torque-transmitting mechanism selectively interconnecting said third member of said first planetary gearset with said third member of said second planetary gearset, said fifth torque-transmitting mechanism selectively interconnecting said third member of said third planetary gearset with said output shaft, and said sixth torque-transmitting mechanism selectively interconnecting said third member of said second planetary gearset with said third member of said third planetary gearset, or said first torque-transmitting mechanism selectively interconnecting said input shaft with said first member of said first planetary gearset, said second torque-transmitting mechanism selectively interconnecting said input shaft with said second member of said first planetary gearset, said third torque-transmitting mechanism selectively interconnecting said first member of said first planetary gearset with said third member of said second planetary gearset, said fourth torque-transmitting mechanism selectively interconnecting said third member of said first planetary gearset with said interconnecting member, said fifth torque-transmitting mechanism selectively interconnecting said third member of said first planetary gearset with said third member of said third planetary gearset, and said sixth torque-transmitting mechanism selectively interconnecting said third member of said third planetary gearset with said output shaft, or said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said second member of said first planetary gearset with said second member of said second planetary gearset, said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said third planetary gearset, and said sixth torque-transmitting mechanism selectively interconnecting said third member of said second planetary gearset with said third member of said third planetary gearset, or said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said second member of said first planetary gearset with said second member of said second planetary gearset, said fourth torque-transmitting mechanism selectively interconnecting said second member of said second planetary gearset with said output shaft, said fifth torque-transmitting mechanism selectively interconnecting said third member of said first planetary gearset with said third member of said second planetary gearset, and said sixth torque-transmitting mechanism selectively interconnecting said third member of said first planetary gearset with said third member of said third planetary gearset, or said first torque-transmitting mechanism selectively interconnecting said input shaft with said first member of said first planetary gearset, said second torque-transmitting mechanism selectively interconnecting said input shaft with said third member of said second planetary gearset, said third torque-transmitting mechanism selectively interconnecting said first member of said first planetary gearset with said interconnecting member, said fourth torque-transmitting mechanism selectively interconnecting said second member of said first planetary gearset with said third member of said second planetary gearset, fifth torque-transmitting mechanism selectively interconnecting said second member of said first planetary gearset with said output shaft, and said sixth torque-transmitting mechanism selectively interconnecting said third member of said first planetary gearset with said third member of said third planetary gearset, or first torque-transmitting mechanism selectively interconnecting said input shaft with said second member of said first planetary gearset, said second torque-transmitting mechanism selectively interconnecting said input shaft with said second member of said second planetary gearset, said third torque-transmitting mechanism selectively interconnecting said second member of said first planetary gearset with said third member of said second planetary gearset, said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said third planetary gearset, and said sixth torque-transmitting mechanism selectively interconnecting said third member of said second planetary gearset with said output shaft, or said first torque-transmitting mechanism selectively interconnecting said input shaft with said first member of said first planetary gearset, said second torque-transmitting mechanism selectively interconnecting said input shaft with said third member of said third planetary gearset, said third torque-transmitting mechanism selectively interconnecting said second member of said first planetary gearset with said interconnecting member, said fourth torque-transmitting mechanism selectively interconnecting said second member of said first planetary gearset with said third member of said third planetary gearset, said fifth torque-transmitting mechanism selectively interconnecting said third member of said first planetary gearset with said third member of said second planetary gearset, and said sixth torque-transmitting mechanism selectively interconnecting said third member of said first planetary gearset with said output shaft.

3. The transmission defined in claim 2 further wherein:

said first member of said planetary gearsets is a member of a first group consisting of a sun gear member, a ring gear member, and a planet carrier assembly member, said second member of said planetary gearsets is a member of a second group consisting of the members of said first group not selected as said first member, and said third member of said planetary gearsets is said member of said first group not selected as said first member and second member.

4. The transmission defined in claim 1 further comprising:

said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said second member of said first planetary gearset with said second member of said second planetary gearset, said fourth torque-transmitting mechanism selectively interconnecting said third member of said first planetary gearset with said interconnecting member, said fifth torque-transmitting mechanism selectively interconnecting said third member of said first planetary gearset with said third member of said second planetary gearset or said third member of said third planetary gearset, and said sixth torque-transmitting mechanism selectively interconnecting said transmission housing with said second member of said second planetary gearset, or said fourth torque-transmitting mechanism selectively interconnecting said third member of said first planetary gearset with said third member of said second planetary gearset, said fifth torque-transmitting mechanism selectively interconnecting said third member of said first planetary gearset with said third member of said third planetary gearset, and said sixth torque-transmitting mechanism selectively interconnecting said second member of said second planetary gearset with said third member of said second planetary gearset, or said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said second planetary gearset, and said sixth torque-transmitting mechanism selectively interconnecting said third member of said second planetary gearset with said third member of said third planetary gearset, or said fourth torque-transmitting mechanism selectively interconnecting said second member of said second planetary gearset with said output shaft, said fifth torque-transmitting mechanism selectively interconnecting said third member of said first planetary gearset with said third member of said third planetary gearset, or said third torque-transmitting mechanism selectively interconnecting said third member of said first planetary gearset with said interconnecting member, said fourth torque-transmitting mechanism selectively interconnecting said third member of said first planetary gearset with said second member of said second planetary gearset, said fifth torque-transmitting mechanism selectively interconnecting said third member of said second planetary gearset with said output shaft, and said sixth torque-transmitting mechanism selectively interconnecting said second member of said second planetary gearset with said third member of said third planetary gearset, or said second torque-transmitting mechanism selectively interconnecting said input with said interconnecting member, said third torque-transmitting mechanism selectively interconnecting said second member of said first planetary gearset with said second member of said second planetary gearset, said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said third planetary gearset, and said sixth torque-transmitting mechanism selectively interconnecting said housing with said interconnecting member, or said third member of said second planetary gearset with said third member of said third planetary gearset, said second torque-transmitting mechanism selectively interconnecting said input shaft with said second member of said second planetary gearset, said third torque-transmitting mechanism selectively interconnecting said second member of said first planetary gearset with said third member of said third planetary gearset, said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said third planetary gearset, and said sixth torque-transmitting mechanism selectively interconnecting said interconnecting member with said transmission housing or with said third member of said third planetary gearset, or said third torque-transmitting mechanism selectively interconnecting said interconnecting member with said output shaft, said fourth torque-transmitting mechanism selectively interconnecting said third member of said first planetary gearset with said third member of said second planetary gearset, said fifth torque-transmitting mechanism selectively interconnecting said third member of said first planetary gearset with said third member of said third planetary gearset, and said sixth torque-transmitting mechanism selectively interconnecting said third member of said second planetary gearset with said third member of said third planetary gearset, or said third torque-transmitting mechanism selectively interconnecting said third member of said first planetary gearset with said interconnecting member, said fourth torque-transmitting mechanism selectively interconnecting said third member of said first planetary gearset with said third member of said second planetary gearset, said fifth torque-transmitting mechanism selectively interconnecting said third member of said third planetary gearset with said output shaft, and said sixth torque-transmitting mechanism selectively interconnecting said third member of said second planetary gearset with said third member of said third planetary gearset, or said third torque-transmitting mechanism selectively interconnecting said second member of said first planetary gearset with said second member of said second planetary gearset, said fourth torque-transmitting mechanism selectively interconnecting said third member of said first planetary gearset with said second member of said second planetary gearset, said fifth torque-transmitting mechanism selectively interconnecting said third member of said first planetary gearset with said third member of said third planetary gearset, and said sixth torque-transmitting mechanism selectively interconnecting said third member of said second planetary gearset with said output shaft, or said first torque-transmitting mechanism selectively interconnecting said input shaft with said first member of said first planetary gearset, said second torque-transmitting mechanism selectively interconnecting said input shaft with said interconnecting member, said third torque-transmitting mechanism selectively interconnecting said first member of said first planetary gearset with said third member of said first planetary gearset, said fourth torque-transmitting mechanism selectively interconnecting said second member of said first planetary gearset with said third member of said third planetary gearset, said fifth torque-transmitting mechanism selectively interconnecting said third member of said first planetary gearset with said third member of said second planetary gearset, and said sixth torque-transmitting mechanism selectively interconnecting said transmission housing with said second member of said first planetary gearset, or said second torque-transmitting mechanism selectively interconnecting said input shaft with said third member of said first planetary gearset, said third torque-transmitting mechanism selectively interconnecting said first member of said first planetary gearset with said third member of said third planetary gearset, said fourth torque-transmitting mechanism selectively interconnecting said second member of said first planetary gearset with said interconnecting member, said fifth torque-transmitting mechanism selectively interconnecting said second member of said first planetary gearset with said third member of said second planetary gearset, and said sixth torque-transmitting mechanism selectively interconnecting said transmission housing with said third member of said first planetary gearset, or said third torque-transmitting mechanism selectively interconnecting said first member of said first planetary gearset with said interconnecting member, said fourth torque-transmitting mechanism selectively interconnecting said second member of said first planetary gearset with said third member of said second planetary gearset, said fifth torque-transmitting mechanism selectively interconnecting said second member of said first planetary gearset with said output shaft, and said sixth torque-transmitting mechanism selectively interconnecting said third member of said first planetary gearset with said third member of said third planetary gearset, or said second torque-transmitting mechanism selectively interconnecting said input shaft with said third member of said third planetary gearset, said third torque-transmitting mechanism selectively interconnecting said first member of said first planetary gearset with said third member of said second planetary gearset, said fourth torque-transmitting mechanism selectively interconnecting said second member of said first planetary gearset with said interconnecting member, said fifth torque-transmitting mechanism selectively interconnecting said second member of said first planetary gearset with said third member of said third planetary gearset, and said sixth torque-transmitting mechanism selectively interconnecting said third member of said first planetary gearset with said output shaft, or said second torque-transmitting mechanism selectively interconnecting said input shaft with said second member of said first planetary gearset, said third torque-transmitting mechanism selectively interconnecting said first member of said first planetary gearset with said third member of said second planetary gearset, said fourth torque-transmitting mechanism selectively interconnecting said third member of said first planetary gearset with said interconnecting member, said fifth torque-transmitting mechanism selectively interconnecting said third member of said first planetary gearset with said third member of said third planetary gearset, and said sixth torque-transmitting mechanism selectively interconnecting said third member of said third planetary gearset with said output shaft, or said second torque-transmitting mechanism selectively interconnecting said input shaft with said third member of said third planetary gearset, said third torque-transmitting mechanism selectively interconnecting said second member of said first planetary gearset with said interconnecting member, said fourth torque-transmitting mechanism selectively interconnecting said second member of said first planetary gearset with said third member of said third planetary gearset, said fifth torque-transmitting mechanism selectively interconnecting said third member of said first planetary gearset with said third member of said second planetary gearset and said sixth torque-transmitting mechanism selectively interconnecting said third member of said first planetary gearset with said output shaft.

* * * * *